Aug. 24, 1965
C. R. HILPERT
3,202,018
POWER TRANSMISSION
Filed April 16, 1962
10 Sheets-Sheet 5
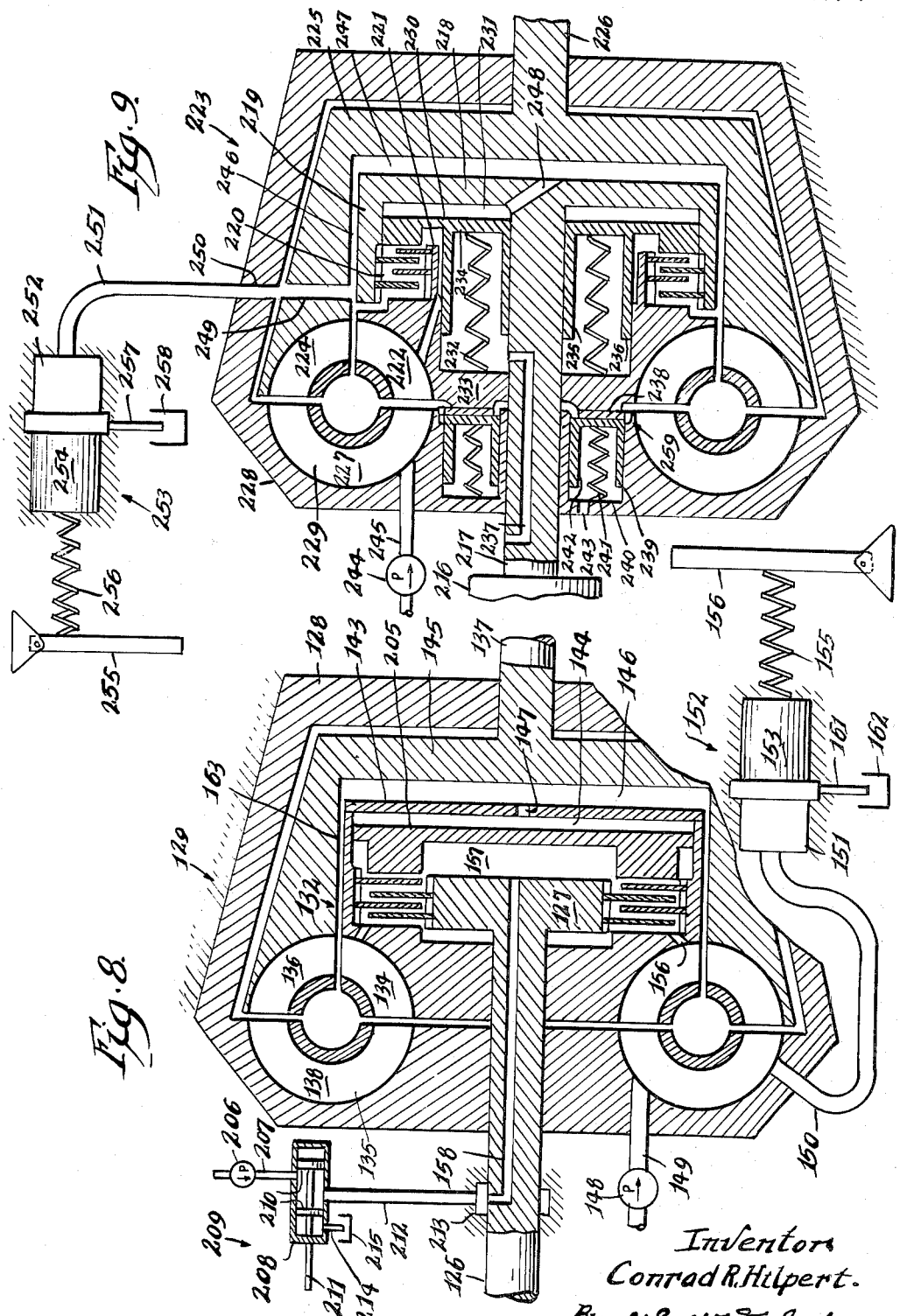
Inventor
Conrad R. Hilpert.
By John W Farley
Attorney.

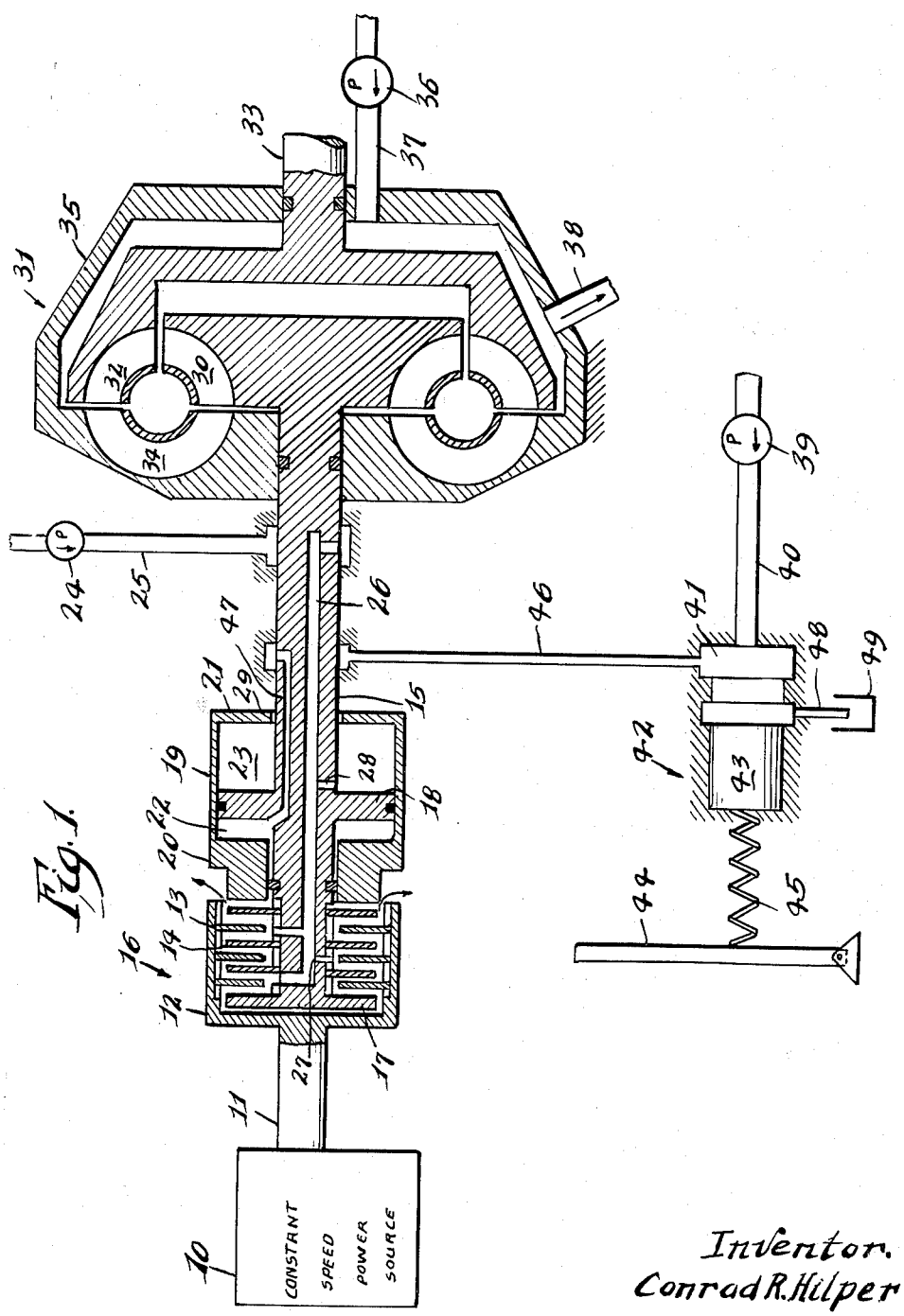

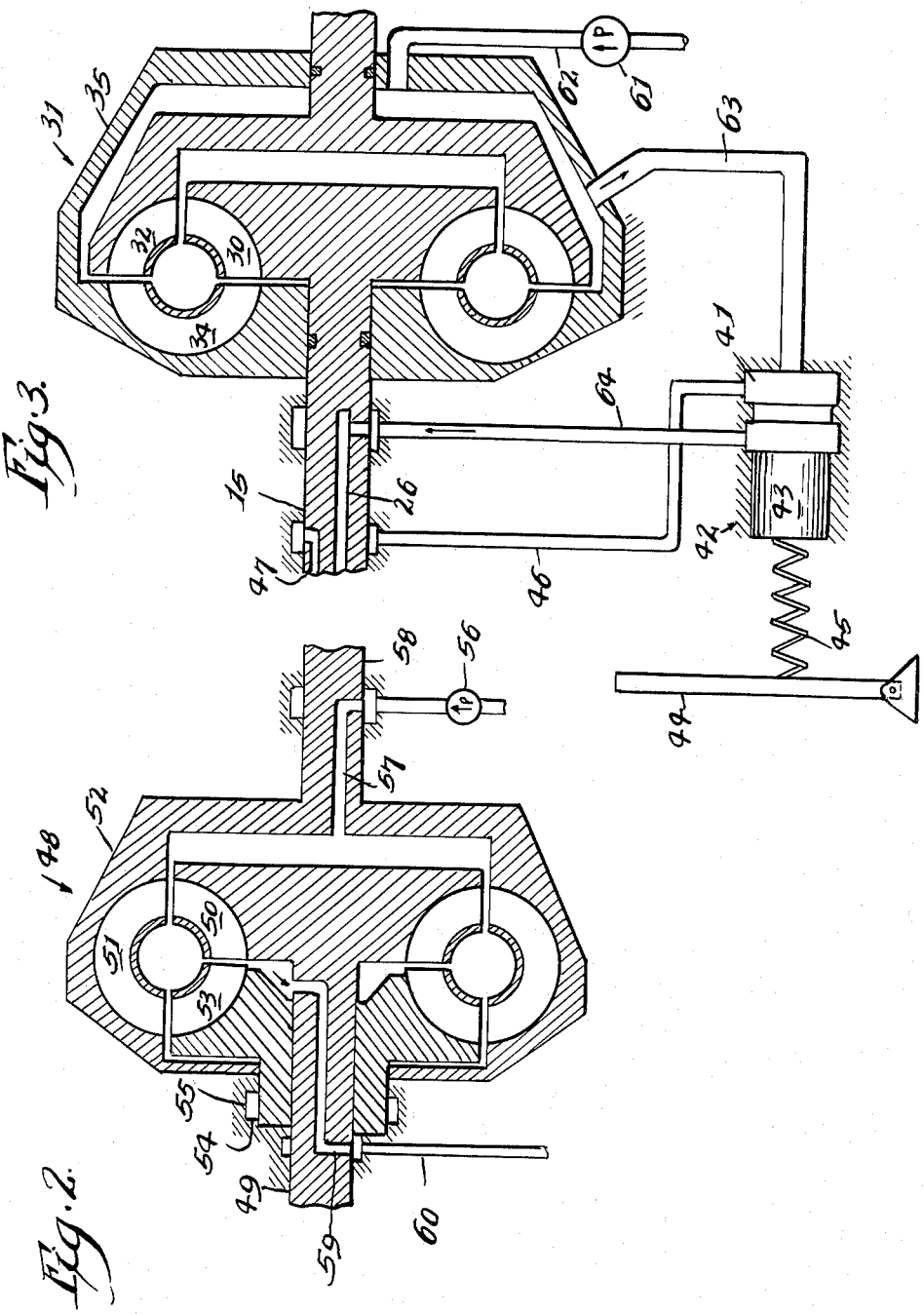

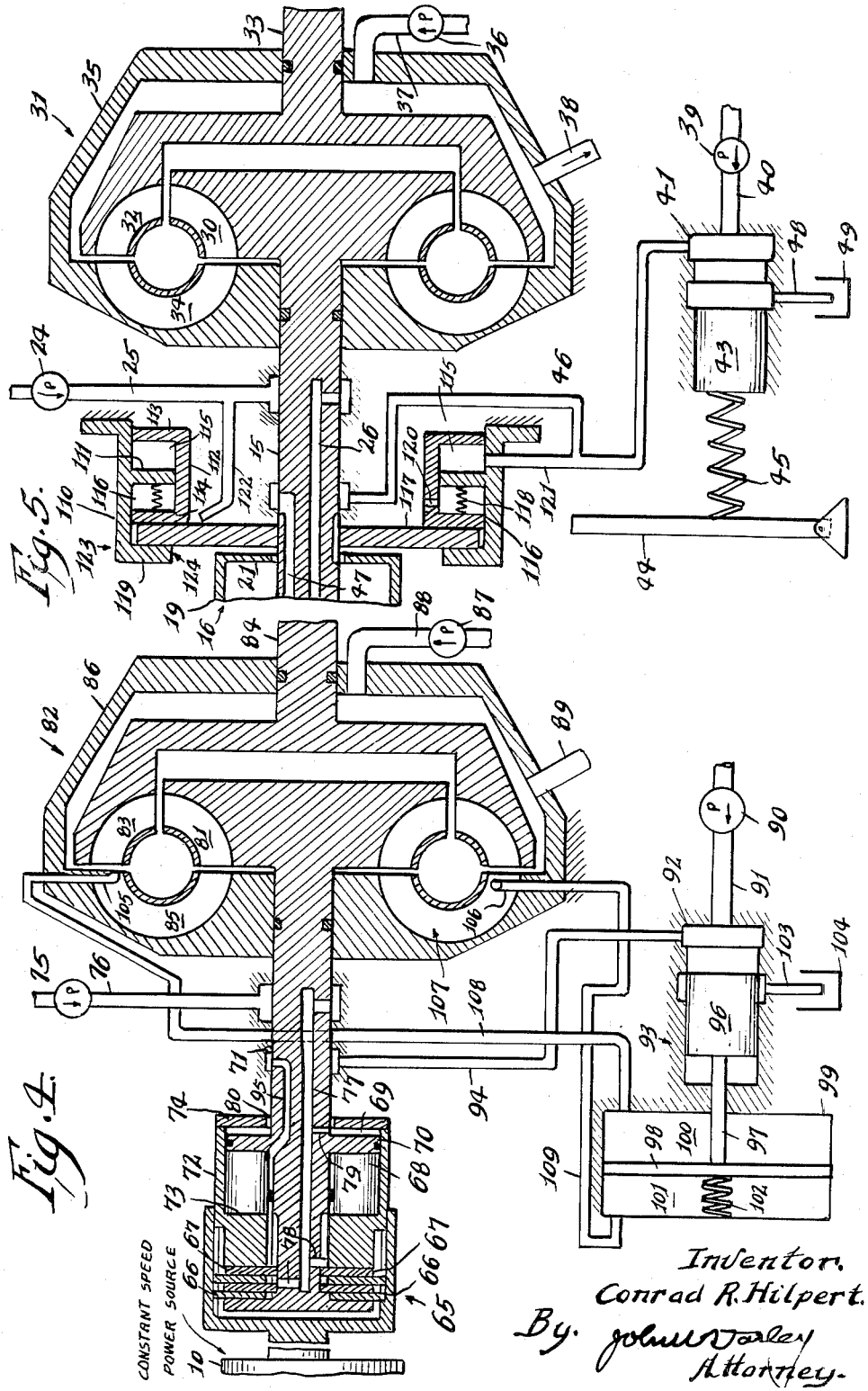

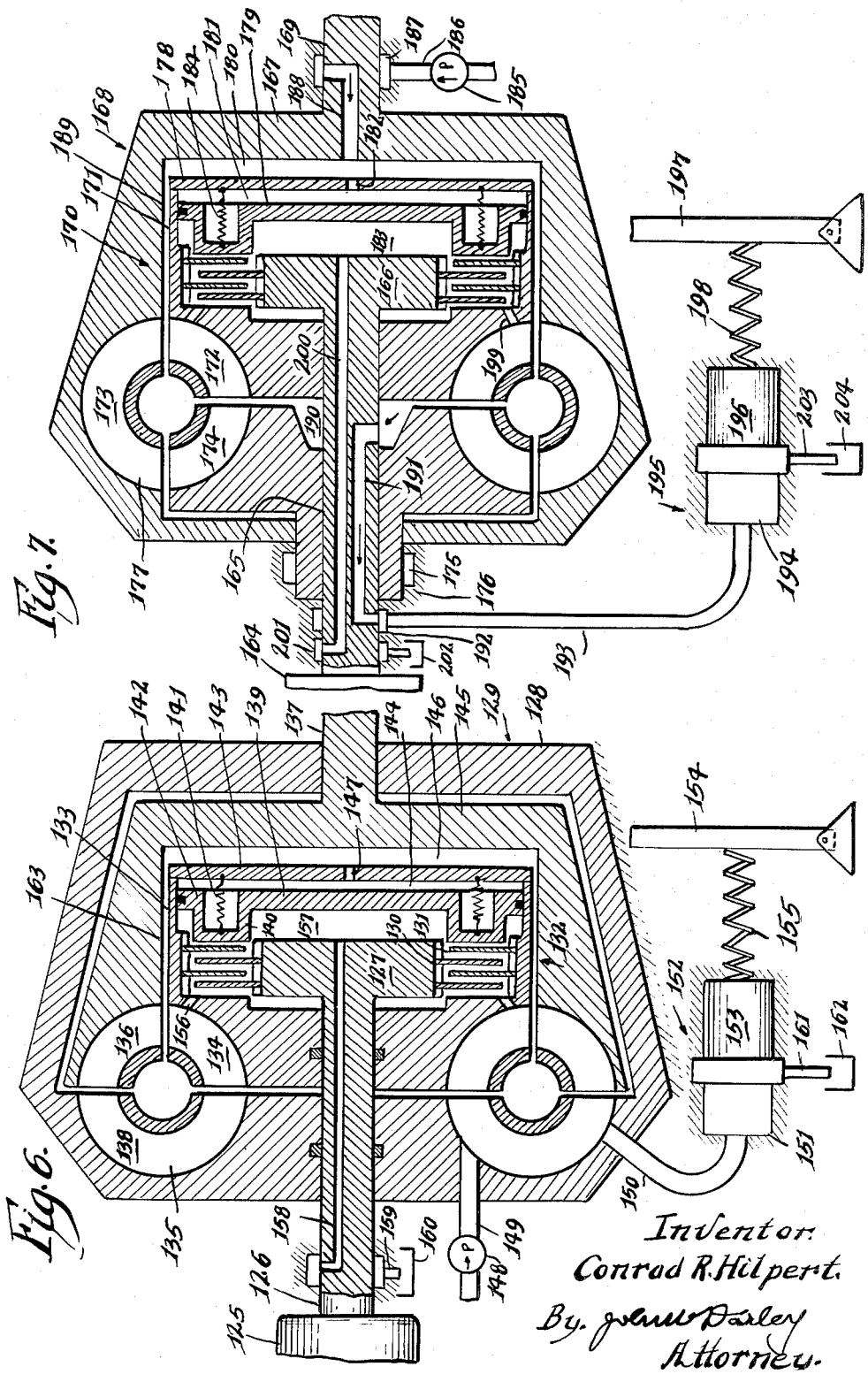

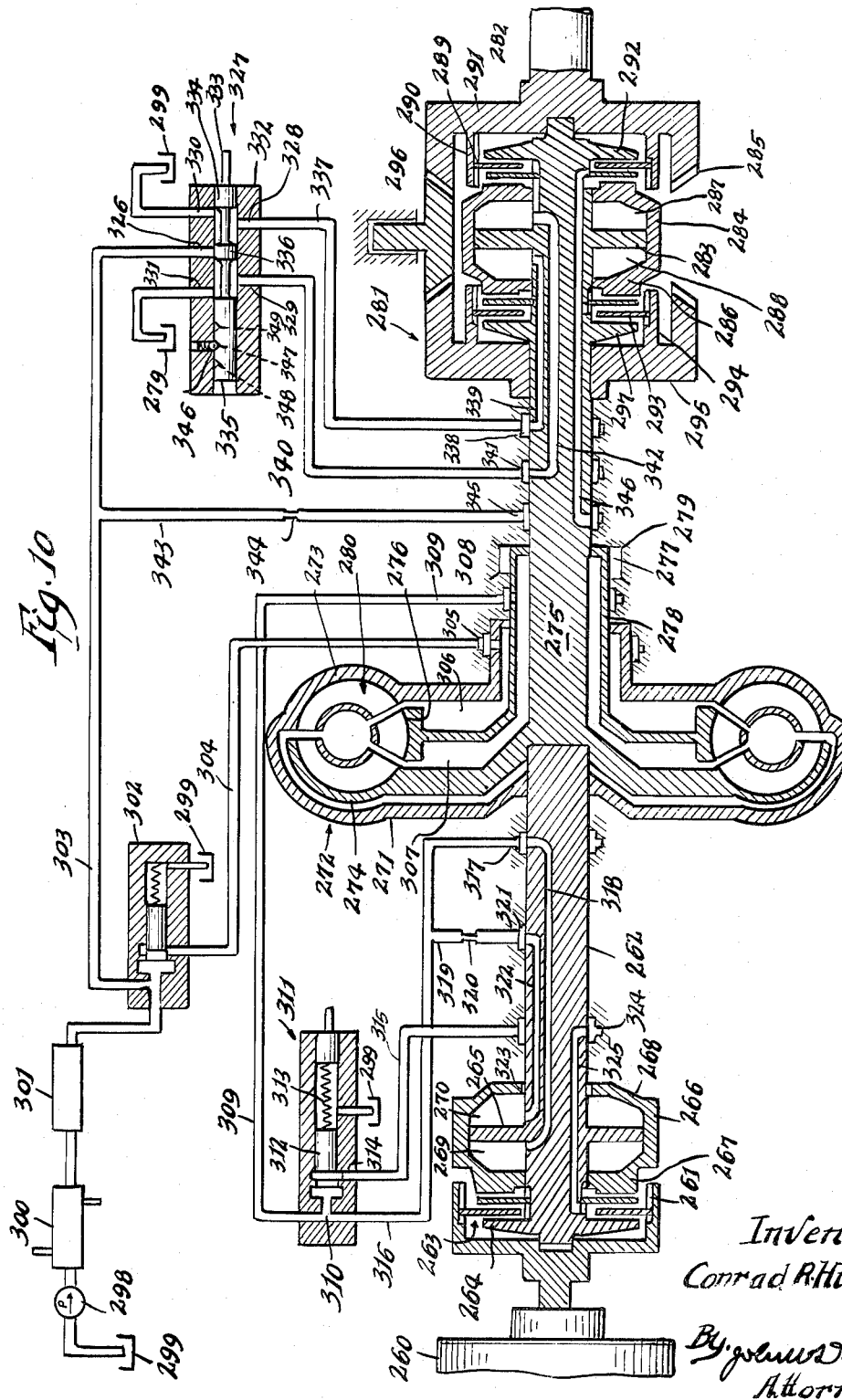

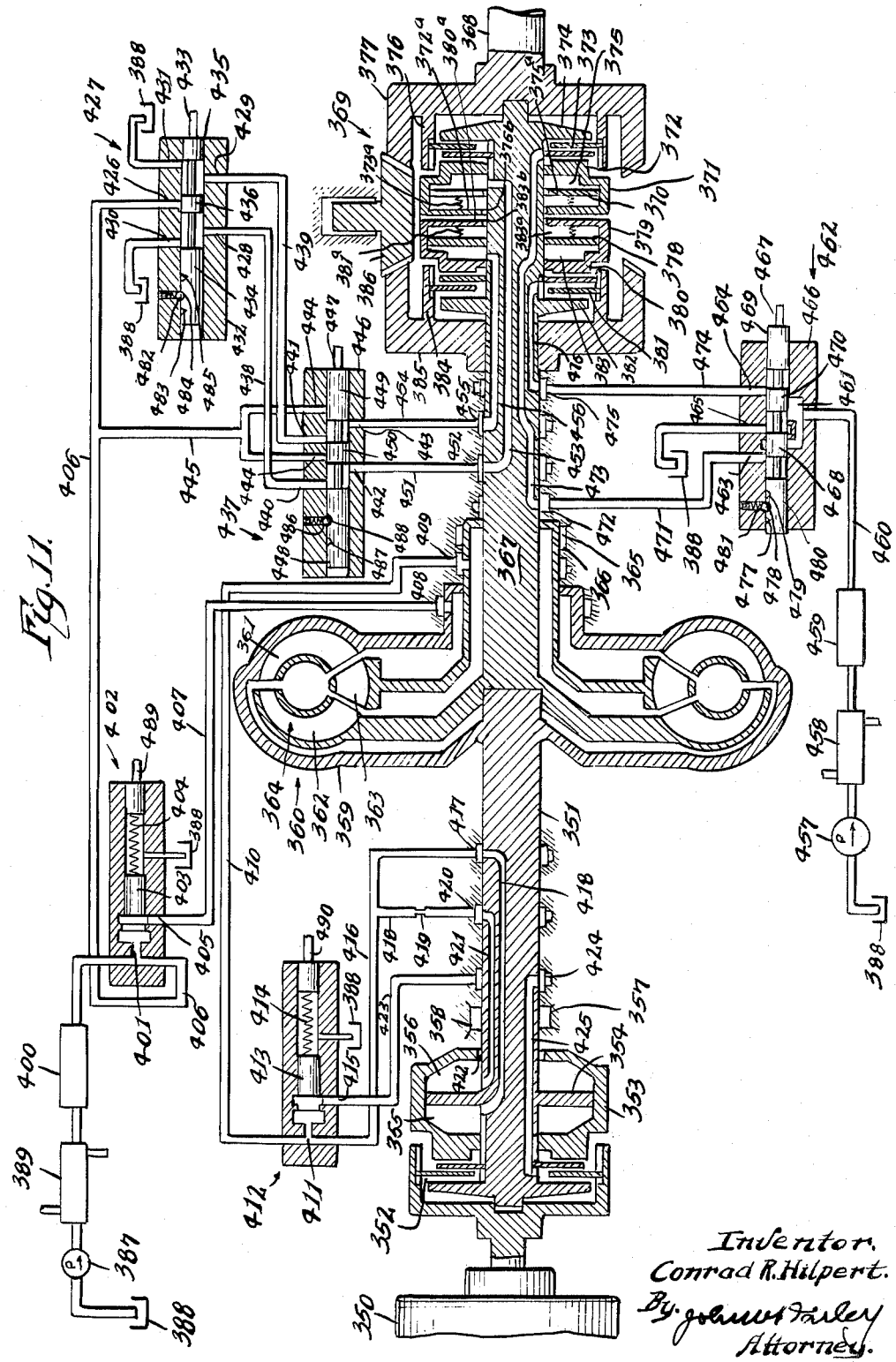

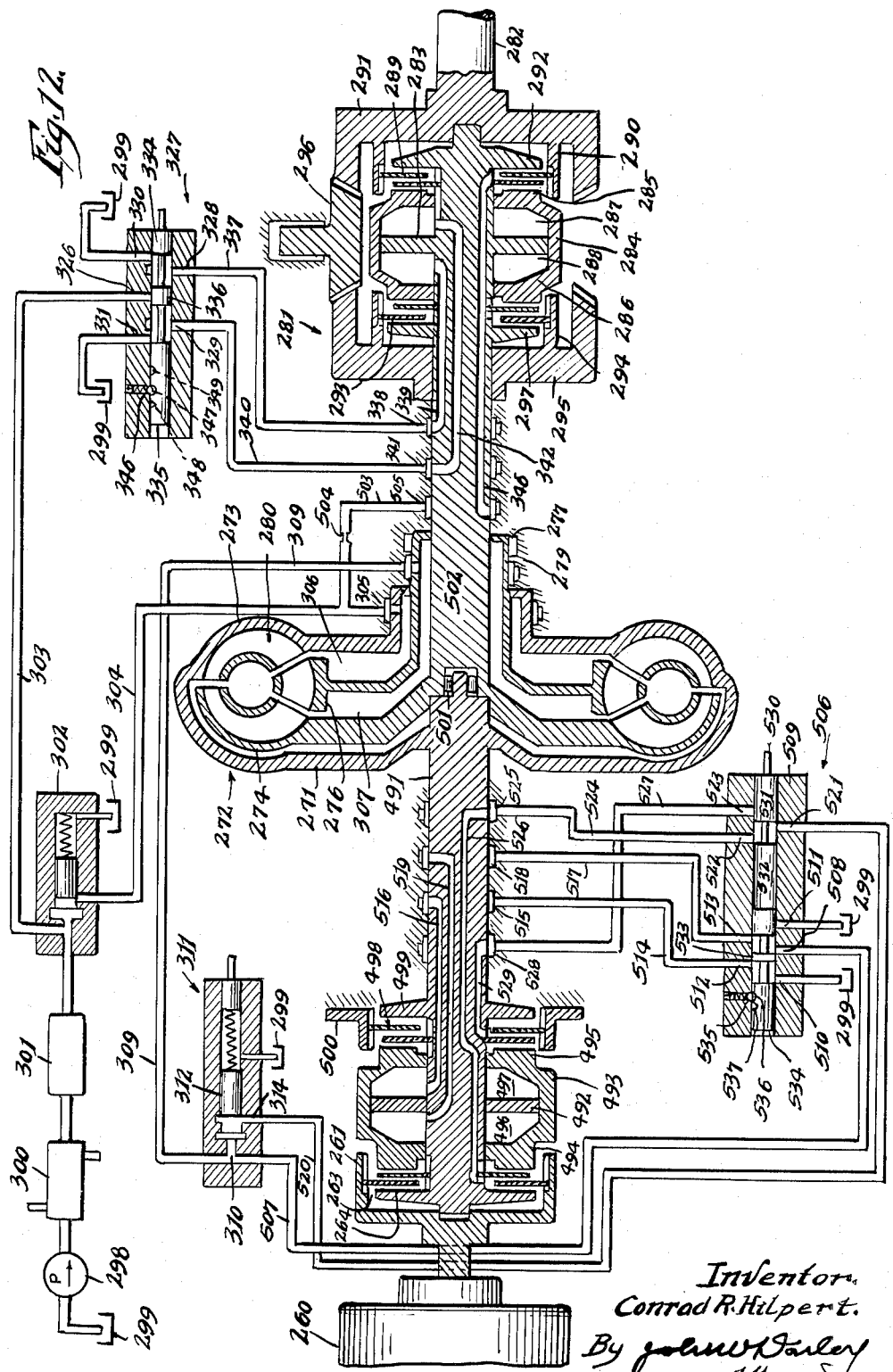

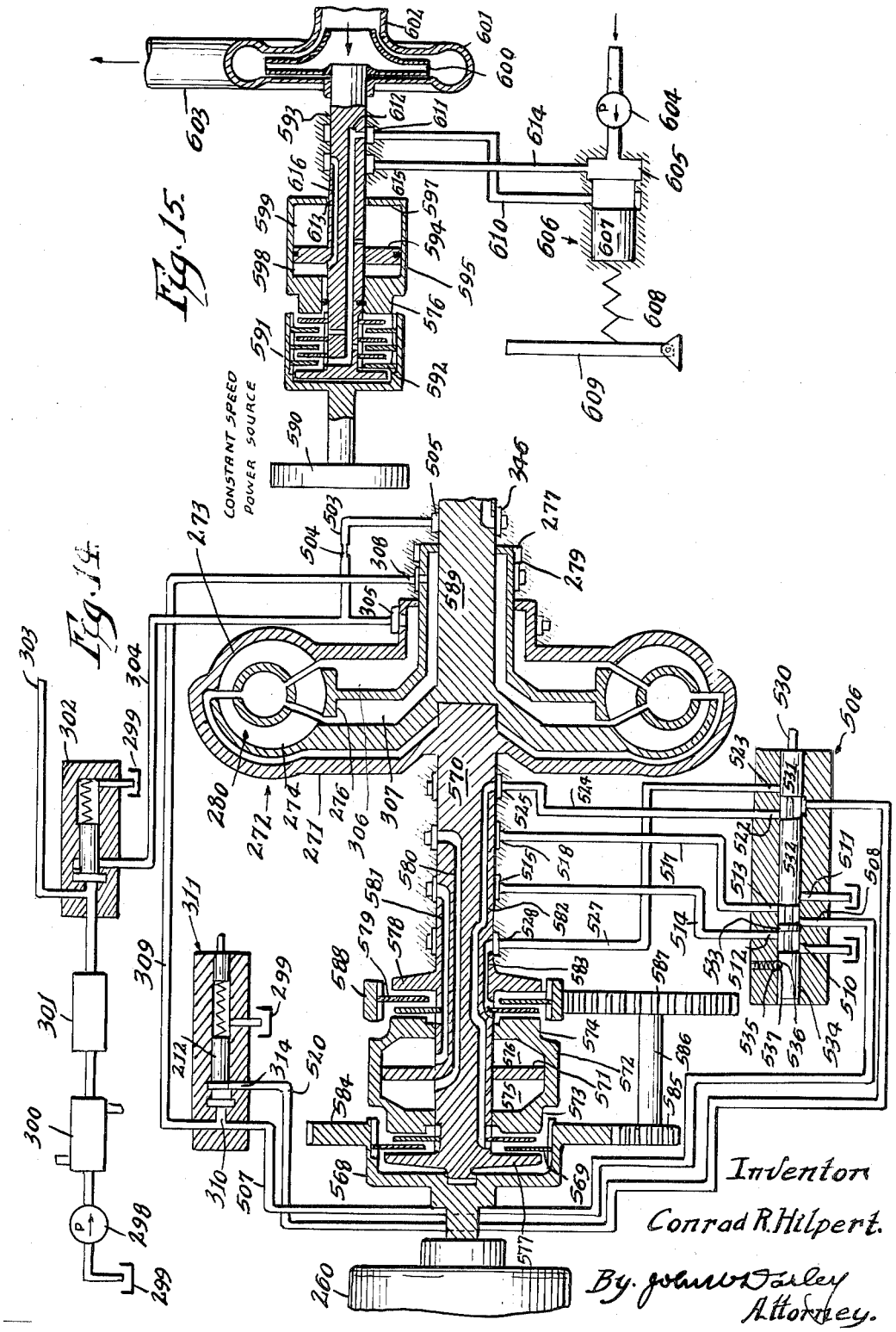

United States Patent Office 3,202,018
Patented Aug. 24, 1965

3,202,018
POWER TRANSMISSION
Conrad R. Hilpert, Winnebago, Ill., assignor to Twin Disc Clutch Company, Racine, Wis., a corporation of Wisconsin
Filed Apr. 16, 1962, Ser. No. 187,741
12 Claims. (Cl. 74—732)

My invention relates generally to power transmissions including in order of power flow a constant speed power source, a friction clutch conditioned for slippage control to vary torque or speed output therefrom, and a bladed member rotating in a fluid.

In its broadest aspect, the invention comprehends the interposition of a variable capacity clutch between a constant speed power source and a rotating bladed member operating in a fluid wherein the member absorbs torque proportional to some function of its speed and the clutch serves as a torque and speed control for the member. Examples of such bladed members are centrifugal pumps, air fans, air and water propellers, hydraulic couplings and hydraulic torque converters. For convenience in description, most of the applications of the invention disclosed herein utilize hydraulic torque converters whose impellers constitute the above noted bladed member and one application is concerned with a centrifugal pump.

It is recognized that positioning a friction plate clutch ahead of a converter or of any bladed member in a power train is generally old, but such located clutches, so far as known, have been utilized to ultimately provide the usual solid connection between the input and output thereof. Any slippage that occurred was merely for the purpose of softening or modulating the full engagement of the clutch and hence was incidental to the overall operation. Torque and speed control were otherwise determined.

In the present instance, slippage of the clutch is a characteristic of the operation and is a means of control for adjusting the power, torque or speed from a constant speed power source to a load without the generation of extreme losses.

While a slipping clutch develops heat, it has been ascertained that, considering the overall transmission, the maximum clutch heat horsepower never exceeds about 15% of the maximum input horsepower to the converter, or bladed member generally. This maximum clutch heat horsepower occurs when the clutch is slipping approximately 33.0% of the maximum power source speed and this clutch heat is approximately 15% of the total power source horsepower when a converter, for example, is operating at approximately two-thirds of the speed of the power source. By providing an adequate heat exchanger to cool the converter at this two-thirds speed point, the slipping clutch will not cause overheating and, in fact, slipping of the clutch will cause a reduction in the total heat load on the cooling system.

The improved transmission is useful with any type of power source and particularly with those types which cannot be directly coupled to a load without the addition of some device, manually or automatically operated, for controlling the torque or speed transmitted to the load. Examples of such power sources are induction motors, gas turbines and turbo-charged diesel engines. The transmission provides for infinitely smooth or stepless control and is instantly responsive to the demands of the operator from zero output speed or torque to full speed or torque. It is therefore possible to inch the load as desired and to operate the load at any desired reduced speed for sustained periods without excessive heating.

A special application of the improved transmission is in the field of electrically operated vehicles, such as locomotives, railway cars and buses. The power usually available for the operation of such vehicles in the United States is provided by a three-phase current having the standard frequency of 60 cycles per second although in some localities specialized circuits having a frequency of 25 cycles have been employed in electric railway operation since such frequency enabled to use of commutator motors which are characterized by high starting torque and economic speed control.

For the most part, however, electric railway operation utilizes the standard 60 cycle frequency current but not directly. While the ordinary induction motor can be driven directly by a three-phase current of normal frequency and voltage and is cheaper than the commutator motor, the poor starting characteristics of the former motor and the complications required to control its speed rule it out for electric railway operation. Recourse is had to one of the available forms of conversion arrangements whereby the available three-phase current is transformed to direct current to enable the use of direct current motors and multiple step resistance controllers.

With the improved transmission and in the interest of simplifying the structure and reducing the cost of the installation, it is possible to use therewith as a power source a non-variable speed, alternating current motor, such as a squirrel cage induction motor. All control is exercised by slipping a master clutch in conjunction with a torque converter and auxiliary clutches for determining foward and reverse drives and for braking.

There has been proposed for electric railway operation, see U.S. Letters Patent No. 2,839,011, dated June 17, 1958, a transmission including an induction motor and an hydraulic torque converter, but control in this instance is achieved by varying the flow of the working liquid in the converter through selective positionings of one or more of the blade sets, impeller, turbine or stator. Variable blade settings affect the efficiency of the converter. The present transmission does not require a converter of a particular design since the control is exercised elsewhere.

It is therefore the principal object of the invention to provide a power transmission including in series power flow relation a constant speed power source, a controllable slip, friction plate clutch, and a bladed member rotatable in a fluid.

A further object is to provide a power transmission of the above type wherein the bladed member is constituted by the impeller of an hydraulic torque converter of the rotating or stationary housing type.

A further object is to provide a transmission of the character indicated in which the clutch is of the hydraulically actuated type and may be positioned externally of or within the converter, and the actuating pressure therefor is either manually controlled or automatically determined in relation to the outspeed or torque of the converter.

A further object is to devise a transmission as above which incorporates a controllable brake between the output of the clutch and the input of the converter, the engagement of the brake preventing creeping rotation of the converter impeller occasioned by shear of the cooling oil on the clutch plates.

A further object is to provide for electric vehicle operation a transmission as above in which an induction motor constitutes the constant speed power source and the converter connects with the load shaft through selective gearing determining forward or reverse movements of the vehicle and neutral.

A further object is to provide a transmission for electric vehicle operation in which with the induction motor running at its normal, constant speed and the vehicle descending a hill, either a constant speed of the vehicle can be maintained or the vehicle brought to a stop by effecting a braking action occasioned by a simultaneous reverse rotation of the turbine and a controlled forward and normal rotation of the impeller determined, respectively, by an operation of the reverse gearing and a selected contact of the plates of the master friction clutch.

A further object is to effect dynamic braking in a vehicle transmission of the character indicated by employing a bladed, coupling type retarder associated with the converter output shaft and to which pressure liquid is diverted from the supply line to the converter.

In the drawings:

FIG. 1 is a sectional elevation schematically showing a power train including a constant speed power source, a stationary housing, hydraulic torque converter, and an hydraulically actuated, friction plate clutch interposed therebetween and controllable as to slip for regulating power input to the converter.

FIG. 2 is a fragmentary, sectional schematic of a rotating housing, hydraulic torque converter which may be utilized in the power train shown in FIG. 1 as a substitute for the stationary housing converter.

FIG. 3 is a fragmentary, sectional schematic of a stationary housing converter which may be used in the FIG. 1 power train, the distinction from the latter being that one oil source provides working oil for the toroidal circuit of the converter and oil pressure for the master clutch under the control of a regulating valve.

FIG. 4 is a fragmentary, sectional schematic of a stationary housing converter which may also be used in the FIG. 1 power train and in which slippage control of the clutch is automatically regulated by Pitot tubes in the toroidal circuit of the converter which may be adjusted to sense either output speed or torque of the converter.

FIG. 5 is a fragmentary, sectional schematic of a power train which is identical with FIG. 1 except for the interposition of a brake between the clutch and converter to provide a combination braking and powering of the impeller to improve the overall control.

FIGS. 6 and 7 are sectional schematics of a modified power train wherein the slip control clutches are incorporated within the bodies of the converters, the latter respectively being of the stationary and rotating housing types.

FIG. 8 is a fragmentary, sectional schematic showing a variant of the converter shown in the FIG. 6 power train wherein the clutch is hydraulically released.

FIG. 9 is a fragmentary, sectional schematic of a converter which varies from those shown in FIGS. 6, 7 and 8 by the inclusion of braking means.

Figure 13:
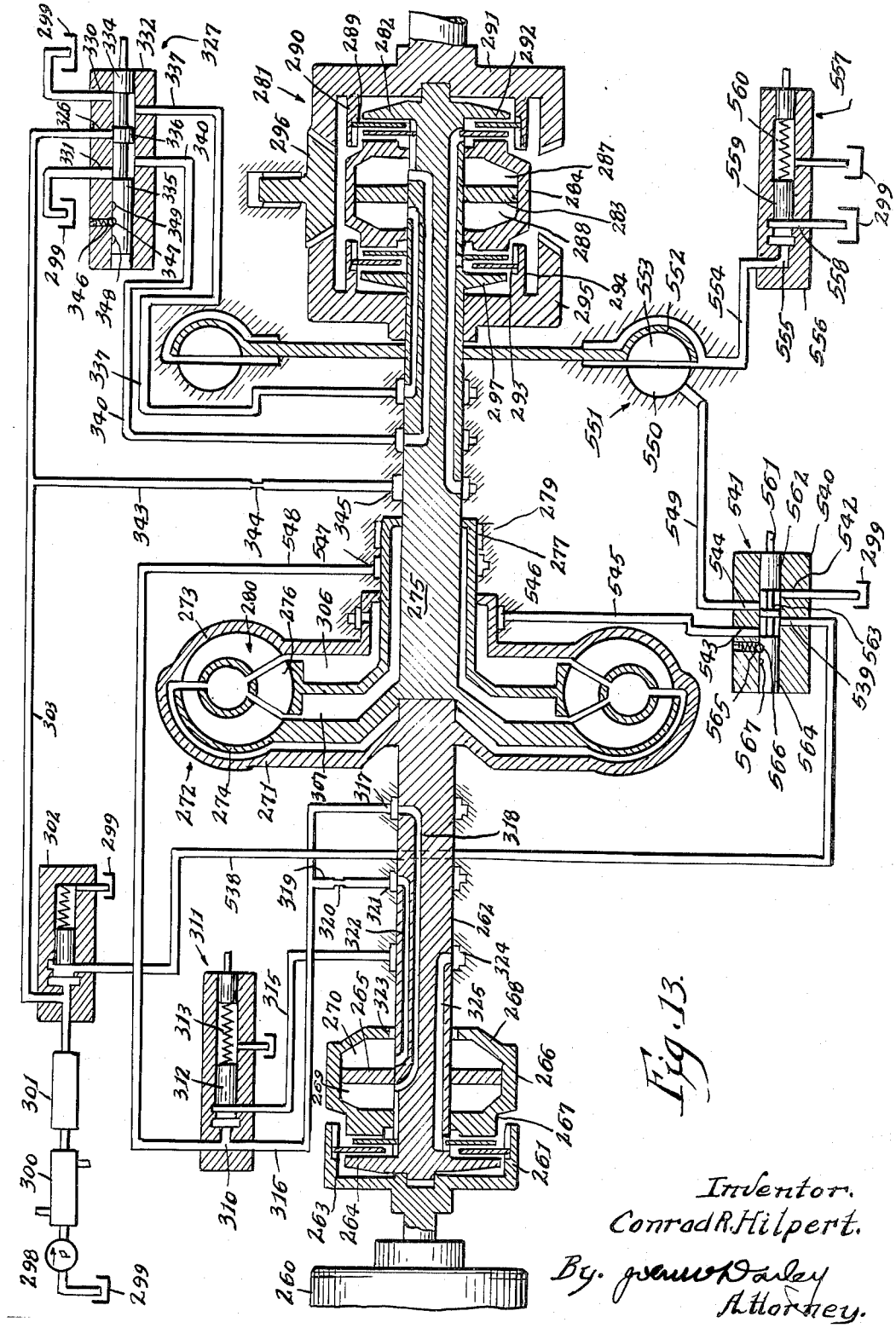

FIGS. 10 to 14, inclusive, are sectional schematics showing variant forms of power trains embodying the invention which are more particularly intended for use with a constant speed, electric power source, such as an induction motor, that is powered by an alternating current having the standard 60 cycle frequency and is particularly adapted for electric vehicle operation, such as commuter trains.

FIG. 15 is a schematic view similar to FIG. 1 wherein the output connection of the clutch is to a centrifugal pump generally indicative of a rotatable bladed member operating in a fluid.

Referring to FIG. 1, the numeral 10 designates a conventional, constant speed power source of the type which cannot normally be connected to a load without auxiliaries of some kind for controlling the torque or speed transmitted to the load. General examples of such power sources are induction motors, gas turbines and internal combustion engines. The power source 10 is drivably connected through a shaft 11 with an annular shell 12 that has driving and relative sliding connection with a plurality of annular, friction clutch plates 13 which are alternately related to a similar group of clutch plates 14 that are drivably connected and slidable relative to a shaft 15. Collectively, the plates 13 and 14 define a friction clutch 16 which is hydraulically actuated by a suitable oil as presently described and which when engaged to any extent are limited in their axial movement by an abutment plate 17 carried by the shaft 15.

Axially spaced from the clutch 16 is an annular reaction plate 18 carried by the shaft 15 and held against axial movement and slidable on the periphery of the plate 18 is a cylindrical shell 19 having transverse end walls 20 and 21 which in conjunction with the shaft 15 and reaction plate 18 respectively define annular engaging and balance chambers 22 and 23, the chamber 22 being appropriately sealed relative to the shaft 15 and reaction plate 18. Cooling oil is constantly supplied to the plates of the clutch 16 by a suitable pump 24 whose output connects through a pipe 25 with one end of a longitudinal passage 26 in the shaft 15 and the opposite end of this passage communicates through a plurality of transverse passages 27 with the inner portions of the plates of the clutch 16 for outward radial flow thereover and delivery to a suitable sump (not shown). The passage 26 also connects through a transverse passage 28 with the balance chamber 23 from which the oil constantly discharges to the sump through an annular orifice 29. The chamber 23 is maintained full during its volume changes and serves to balance the centrifugal pressure on the oil in the engaging chamber 22.

The shaft 15 is drivably connected to an impeller 30 forming part of an hydraulic torque converter 31 which otherwise includes a turbine 32 connected to a load shaft 33 and a stator 34 carried by the stationary housing 35 of the converter, the impeller, turbine and stator being related to form the usual toroidal circuit. The single stage converter 31, as shown, is merely by way of example since the invention is not dependent upon a particular converter design and all converters exhibit similar input characteristics. Actually, the broadest aspect of the invention is concerned with the utilization of a slippable friction clutch as a means of regulating the power input to a bladed member operating in a fluid medium where such power is derived from a constant speed power source. A constant oil flow at a basic, static pressure is maintained through the converter 31 in accordance with conventional practice by means of an appropriately driven pump 36 whose output connects by a pipe 37 with the interior of the converter 31 and such flow may be discharged through a pipe 38 to a conventional heat exchanger (not shown).

To control the clutch 16 in any slipping or a fully engaged position, a pump 39 delivers oil from a suitable source through a pipe 40 to a chamber 41 forming part of a regulating valve 42 in which is reciprocable a piston 43. Movement of the piston 43 towards the right is effected by a pivoted hand lever 44 acting through a yieldable means such as a helical spring 45 which abuts the piston 43. The chamber 41 connects successively through a pipe 46 and a longitudinal passage 47 in the shaft 15 with the engaging chamber 22.

In the position of parts shown in FIG. 1, the piston 43 occupies its fully retracted position in which it uncovers a passage 48 connecting with the chamber 41 and a sump 49 so that the full output of the pump 39 is delivered to the sump 49 and the clutch 16 stands released. It will be apparent that as the piston 43 is moved towards the right, pressure in the pipe 46, passage 47 and engaging chamber 22 begins rising and the end wall 20 starts moving in a direction to engage the clutch 16. After the clearance between the clutch plates 13 and 14 and the abutment plate 17 has been taken up and the friction surfaces are in contact, torque transmission by the clutch 16 is entirely controlled by the position of the piston 43, such control being infinitely variable.

A rotating housing, hydraulic torque converter 48 may be used instead of the stationary housing converter 31 in the FIG. 1 power train, the latter structure being otherwise unchanged. Referring to FIG. 2, the numeral 49 designates the input shaft of the converter 48 and corresponds to the shaft 15 in FIG. 1 in that it connects through the clutch 16 with the power source 10. The shaft 49 carries an impeller 50 which is torodial circuit related in the conventional manner to a turbine 51 carried by the rotating housing 52 and a stator 53 which is held against rotation during periods of torque multiplication by an overrunning clutch 54 conventionally related to a fixed part 55 of the adjacent equipment. Working oil at a basic, static pressure is continuously supplied by a pump 56 under conventional regulation through a passage 57 in the converter output shaft 58 to the interior of the converter 48 and is discharged therefrom through a passage 59 in the shaft 49 and a pipe 60 to a sump (not shown). Except for the capacity of the stator 53 to freewheel when the turbine 51 attains a determined speed, the operation of the power train incorporating the converter 48 when coupled to the power source 10 through the clutch 16 is identical with the FIG. 1 train.

In FIG. 3 is shown a further modification of the FIG. 1 train which only differs therefrom in the use of a single oil supply for the converter and clutch and because of this similarity, parts in FIG. 3 which are functionally identical with those in FIG. 1 are designated by the same numerals. The single oil supply is continuously furnished by a pump 61 whose output connects through a pipe 62 with the interior of the converter 31 to constantly maintain a basic static pressure in the toroidal circuit thereof and the discharge from the converter 31 flows through a pipe 63 to the chamber 41 of the regulating valve 42. As in FIG. 1, the chamber 41 successively connects through the pipe 46 and passage 47 with the clutch engaging chamber 22.

In the fully retracted position of the piston 43, it fully uncovers the inlet end of a pipe 64 whose opposite end connects with the passage 26 and hence with the balance chamber 23 and the inner edges of the clutch plates 13 and 14 so that the clutch 16 stands released. Since oil flowing through the pipe 64 ultimately reaches the sump, it will be apparent that, to this extent, the pipe 64 is functionally similar to the pipe 48 in FIG. 1. As the piston 43 is moved towards the right, pressure in the pipe 46 and in the toroidal circuit of the converter 31 begins rising and the same variable, torque transmitting condition of the clutch 16 is obtained.

Referring to FIG. 4, there is shown a modified power train which utilizes the same converter and the same type of clutch as in FIG. 1, but differs from the latter train in that the clutch is fully engaged at the beginning of operation and sensing means positioned in the toroidal circuit of the converter is responsive to converter output torque or output speed, which ever is chosen, to reduce the engaging pressure on the clutch and hence its torque transmitting capacity.

The constant speed power source 10 is drivably connected to an hydraulically actuated, friction plate clutch 65 which may be identical with the clutch 16 except that the former's driving and driven plates 66 and 67, respectively, are fully engaged as shown at the instant of start. The clutch structure also includes engaging and balance chambers 68 and 69 which are positioned on opposite sides of an axially fixed reaction member 70 carried by a clutch output shaft 71 and otherwise included within a cylindrical shell 72 having end walls 73 and 74, all respectively.

Oil supply for the balance chamber 69 and cooling oil for the clutch plates 66 and 67 is continuously provided by a pump 75 under conventional regulation whose output connects by a pipe 76 with one end of a longitudinal passage 77 in the shaft 71. The opposite end of the passage 77 connects by transverse passages 78 with the inner portions of the clutch plates 66 and 67 from which the oil flows to a sump (not shown) and an intermediate part of the passage 77 connects through a transverse passage 79 with the balance chamber 69 from which the oil continuously bleeds to the sump through an annular orifice 80 in the end wall 74.

The shaft 71 has power input connection to the impeller 81 of a stationary housing, hydraulic torque converter 82 and the impeller 81 is toroidal circuit related in the conventional manner to a turbine 83 having a load shaft 84 and a stator 85 carried by the converter housing 86. Working oil at a basic, static pressure is continuously supplied to the interior of the converter 82 by a pump 87 through a pipe 88 and is discharged through a pipe 89 to a heat exchanger (not shown).

The FIG. 4 power train is characterized by an automatic control on the engaging pressure of the clutch 65 that is responsive to a selected factor, either converter output torque or output speed, and when such control point is reached, the engaging pressure is reduced to provide a slipping condition of the clutch 65.

A pump 90 having conventional relief control (not shown) continuously supplies oil under pressure through a pipe 91 to a chamber 92 forming part of a regulating valve 93 and the chamber 92 connects through a pipe 94 and a passage 95 in the shaft 71 with the engaging chamber 68. Reciprocable within the valve 93 is a piston 96 which is connected by a rod 97 with a piston 98 that is reciprocable within a housing 99 and defines therewith chambers 100 and 101 for a purpose presently explained. A spring 102 biases the piston 98 and hence the piston 96 in a direction closing a passage 103 which under certain conditions connects the chamber 92 with a sump 104. With the piston 96 positioned as shown, all output of the pump 90 is directed to the engaging chamber 68 so that the clutch 65 is fully engaged which is the condition at the start of operation.

Automatic control on the magnitude of the clutch engaging pressure is provided by Pitot tubes 105 and 106 which extend into the toroidal circuit 107 adjacent the inlet and outlet of the blades of the stator 85. Externally of the converter 82, the Pitot tubes 105 and 106 connect by pipes 108 and 109 with the chambers 100 and 101, all respectively.

The Pitot tubes 105 and 106 are responsive to flow conditions in the toroidal circuit 107 and may be conditioned to sense a determined converter output torque or output speed. The inlet openings of the tubes 105 and 106 are angled relative to the direction of toroidal flow so as to exhibit a differential pressure that is proportional to either of the above factors, the pressure transmitted by the tube 105 being always higher than that by the tube 106. For sensing output torque, the tubes 105 and 106 are adjusted to respond to the flow condition at or near stall, and for sensing output speed, the tubes are adjusted to respond at or near racing. Whichever sensing control is chosen, the total pressures transmitted to the chambers 100 and 101 will be a summation of the static liquid pressure in the toroidal circuit 107 and that due to liquid flow past the tubes 105 and 106, but the static pressure, as far as control is concerned, will be essentially eliminated due to the substantially equal areas on opposite sides of the piston 98. Hence, when the control point is reached, pressure in the chamber 100 exceeds that in the chamber 101 plus the thrust of the spring 102 and the piston 96 is moved to uncover the inlet to the passage 103. Accordingly, the engaging pressure in the chamber 68 is reduced and the clutch 65 begins to slip and reduce the converter output speed or torque, as chosen, to the desired amount.

In FIG. 5 is shown a further modification of the FIG. 1 power train which differs therefrom only in the interposition of a brake between the clutch 16 and the converter 31. Parts in FIG. 5 which are identical with those in FIG. 1 are designated by the same numerals.

The numeral 110 indicates a fixed, annular member which encircles and is coaxial with the shaft 15 between the clutch 16 and the converter 31. Projecting inwardly from the member 110 is an annular flange 111 on whose inner periphery is axially slidable a cylindrical shell 112 having on opposite sides of the flange 111 end walls 113 and 114 which are slidable along the inner surface of the member 110 and define annular chambers 115 and 116, respectively. It will be understood that suitable sealing rings (not shown) would be employed where required. Within the member 110, a brake disk 117 has splined connection to the shaft 15 and a plurality of springs 118 equispaced around the shell 112 and interposed between the flange 111 and end wall 114 bias the latter into friction braking engagement with the disk 117 and this disk into like engagement with an annular, abutment flange 119 extending inward of the member 110. A vent 120 connects the chamber 116 with the atmosphere to insure free action of the springs 118.

Connecting with the pipe 46 which conducts pressure to the passage 47 and thence to the engaging chamber 22 of the clutch 16 is a pipe 121 whose outlet connects with the chamber 115 and a pipe 122 leading from the pipe 25 has its delivery end directed to continuously supply cooling oil to the brake, generally designated by the numeral 123, and such oil returns to the sump in the annular location 124.

With the piston in the position shown in FIG. 5, the output of the pump 39 is delivered to the sump 49 so that the clutch 16 stands released. The brake 123, however, is engaged due to the thrust of the springs 118 and this braking action prevents any possible torque application to the impeller 30 due to the cooling oil drag on the plates of the clutch 16 when released which might create an unwanted torque on the converter output shaft 33. When the piston 43 is moved to the right, the rise in pressure in pipe 46 not only moves the clutch plates 13 and 14 into contact to establish any desired torque transmission as explained for FIG. 1, but also establishes pressure in the chamber 115 to release the brake 123 to any desired extent. This modification therefore provides an improvement in control by reason of the combined braking and powering of the impeller 30.

In the power trains described above, the controllable clutch is located externally of the converter, but in FIG. 6 is shown a power train having the indicated characteristics wherein the clutch is positioned within the converter. Referring to FIG. 6, the numeral 125 designates the constant speed power source which connects by a shaft 126 with a hub 127 positioned within the stationary housing 128 of an hydraulic torque converter 129. The hub 127 has driving and relative sliding connection with a plurality of friction clutch plates 130 which are alternately related to like plates 131 to provide a friction clutch 132, the plates 131 having driving and relatively slidable connection to a cylindrical shell 133 that is coaxial with the clutch 132 and projects from an impeller 134. The impeller 134 forms part of a conventional toroidal circuit 135 that otherwise includes a turbine 136 connected to a load shaft 137 and a stator 138 carried by the housing 128.

Sealably slidably within the shell 133 is a piston 139 from which on the side facing the clutch 132 projects an annular pressure ring 140 that registers with and engages the clutch 132 when the piston 139 is hydraulically actuated as presently described. The piston 139 is biased to the clutch release position by a plurality of springs 141 equispaced around the piston 139 and positioned in pockets 142 recessed in the pressure ring portion of the piston 139, the opposite ends of the springs 141 respectively abutting the base of the pockets 142 and a plate 143 which closes the end of the shell 133 remote from the clutch 132.

The plate 143 defines with the piston 139 and shell 133 an engaging chamber 144, and with a cup-shaped member 145 providing connection between the turbine 136 and the load 137 a chamber 146, the chambers 144 and 146 constantly communicating through a passage 147 provided in the plate 143.

For control of the FIG. 6 power train and cooling of the clutch 132, the following instrumentalities are provided. A pump 148 constantly supplies oil to the toroidal circuit 135 through a pipe 149 and discharge from this circuit is through a pipe 150 to a chamber 151 forming part of a regulating valve 152. Reciprocable within the valve 152 is a piston 153 which is shiftable by a pivoted handle 154 acting through a yieldable means such as a helical spring 155.

To cool the plates of the clutch 132, the toroidal circuit 135 is tapped by a plurality of orifice passages 156 which direct a part of the working oil to the outer portions of the clutch plates 130 and 131 from which it flows inwardly to a chamber 157 included between the hub 127 and piston 139. The chamber 157 connects through a passage 158 in the shaft 126 with a pipe 159 leading to a sump.

With the piston 153 in the position shown in FIG. 6, it uncovers a pipe 161 leading to a sump 162 so that all output of the pump 148 is delivered thereto and the piston 139 is retracted to the clutch release position shown by the springs 141. As the piston 153 is moved to the left, pressures begins rising in the toroidal circuit 135 and also in the chamber 146 which connects with the circuit 135 by a suitable spacing of the shell 133 and member 145 that creates an annular passage 163. Since the chambers 146 and 144 communicate through the passage 147, pressure build-up in the latter chamber moves the piston 139 in clutch engaging direction. Regulating movement of the piston 153 therefore not only provides for infinite variations in control of the clutch 132 with respect to its torque transmitting condition, but also varies the basic pressure in the toroidal circuit 135. Suitable seals are provided where required to maintain separate the clutch oil cooling flow and the oil which applies pressure to the piston 139.

In FIG. 7 is shown a variation of the FIG. 6 power train, the difference consisting primarily in the use of a rotating housing, hydraulic torque converter. The numeral 164 designates the constant speed power source which connects by a shaft 165 with a hub 166 positioned within a rotating housing 167 of an hydraulic torque converter 168, the housing 167 being connected in the usual manner with a load shaft 169. As in FIG. 6, the hub 166 is connectible through a friction plate clutch 170 with an annular shell 171 which is coaxial with the shaft 165 and projects from an impeller 172 that is related in the usual manner to a turbine 173 carried by the housing 167 and a stator 174 which, during periods of torque multiplication, is held against rotation by an overrunning clutch 175 conventionally related to the stator 174 and a fixed part 176 of adjacent equipment. The impeller 172, turbine 173 and stator 174 define a toroidal circuit 177.

Also in FIG. 7, the end of the shell 171 remote from the impeller 172 is closed by a plate 178 and reciprocable within the shell 171 between the clutch 170 and plate 178 is a piston 179 that is identical with the piston 139 in FIG. 6. The plate 178 defines with the housing 167 and piston 179 chambers 180 and 181, respectively, which communicate through a passage 182 in the plate 178 and the piston 179 defines with the hub 166 a chamber 183. The piston 179 is biased in the clutch release position by a plurality of springs 184 having their ends respectively abutting the piston 179 and plate 178.

Oil for actuation of the clutch 170 and toroidal circuit 177 is supplied by a pump 185 whose output is delivered successively through a pipe 186, collector ring 187, and passage 188 in the housing 167 and load shaft 169 to the chamber 180 and thence through the passage 182 to the chamber 181. Oil in the chamber 180 also flows through an annular passage 189 between the housing 167 and shell 171 to the toroidal circuit 177 and from the latter, the oil flows successively through a chamber 190 centrally of the converter 168, a passage 191 in the shaft 165, a collector ring 192 and a pipe 193 to a chamber 194 forming part of a regulating valve 195. A piston 196 is shiftable in the valve 195 under the contorl of a handle 197 acting through a helical spring 198.

For cooling of the plates of the clutch 170, the toroidal circuit 177 is tapped by a plurality of orifice passages 199 which direct the oil to the outer part of the clutch 170 and such oil passes successively through the chamber 183, a passage 200 in the shaft 165, and a collector ring 201 to the sump 202.

As in FIG. 6, with a piston 196 in the fully retracted position shown, it uncovers a pipe 203 leading to a sump 204 so that the oil supplied by the pump 185 ultimately reaches the sumps 202 and 204 which may be combined in a single sump. The operation of the FIG. 7 modification is identical with that of FIG. 6 with respect to controlling the converter static pressure and any desired torque transmitting condition of the clutch 170. It will be understood that suitable seals would be employed where necessary to maintain the integrity of the cooling flow to the clutch 170 and that to the toroidal circuit 177 and the engaging chamber 181.

In FIG. 8 is shown a variant mode of releasing a clutch positioned interiorly of a converter and while shown in connection with a stationary housing converter such as in FIG. 6, it is also applicable to the the rotating type shown in FIG. 7. Since the pump for supplying the toroidal circuit and the clutch engaging pressure and the internal construction of the converter except for the clutch engaging piston are identical with the similar parts in FIG. 6, like parts are designated by the same numerals.

In FIG. 8, the clutch 132 is released as determined by the fully retracted position of the piston 153 which removes clutch engaing pressure applied to one end of a piston 205 that may be shaped like the piston 139 in FIG. 6 except for the spring pockets 142 which are omitted. Movement of the piston 205 to the release position is hydraulically effected as will now be described.

A pump 206 equipped with conventional relief means (not shown) delivers oil through a pipe 207 to one end of a casing 208 forming part of a control valve 209 and, in the position of parts shown, specifically to the interior of the casing 208 between spaced lands 210—210 of a spool valve 211 whose stem extends externally of the casing 208 for convenient reciprocation. In this position of the spool valve 211, the pipe 207 connects through a pipe 212 and a collector ring 213 with the passage 158 in the shaft 126 leading to the chamber 157 to thereby provide release pressure for the piston 205. It is recognized that this pressure would likely abut the piston 205 against the plate 143, or against some other convenient stop (not shown), but for purpose of illustration the piston 205 is shown spaced from the plate 143 to clearly show the chamber 144 for receiving the clutch engaging pressure.

When it is desired to engage the clutch 132 to any desired extent by appropriate shifting of the piston 153 as described for FIG. 6, the clutch release pressure is shut off by shifting the spool valve 211 to the left to mask the delivery end of the pipe 207 and to connect through the control valve 209 the pipe 212 with a pipe 214 leading to a sump 215.

Referring to FIG. 9, there is shown a variation of the FIGS. 6 and 7 power trains in which a braking restraint is imposed on the powering of the impeller for the same general purpose as described for the FIG. 5 train.

The numeral 216 designates a constant speed power source which connects through a shaft 217 with a disk 218 which carries an annular shell 219 which extends towards the power source 216 and is coaxial with the shaft 217. A friction plate clutch 220 whose plates are alternately connected to the shell 219 and to an extension 221 carried by an impeller 222 provides when engaged the driving connection between the shaft 217 and impeller 222. The impeller 222 forms part of a stationary housing, hydraulic torque converter 223 and is related in the usual manner to a turbine 224 carried by a cup-shaped member 225 which connects with a load shaft 226 and to a stator 227 incorporated in the stationary housing 228 of the converter 223. The impeller 222, turbine 224 and stator 227 define the usual toroidal circuit 229.

The clutch 220 is engaged by an annular piston 230 slidable in an annular chamber 231 included between the shaft 217, disk 218 and shell 219 and is biased in the release position shown by a plurality of helical springs 232 interposed between the piston 230 and the impeller hub 233. The springs 232 are substantially included in an annular housing 234 extending laterally from the piston 230 and whose inner and outer, annular walls 235 and 236 are slidable on the shaft 217 and extension 221, all respectively. The housing 234 is vented to the atmosphere through a passage 237 in the shaft 217 to insure free action of the springs 232.

An annular, brake plate 238 carried by and axially slidable relative to the converter housing 228 is interposed between the impeller hub 233 and an annular piston 239 which is slidable in an annular pocket 240 provided in the converter housing 228 and helical springs 241 respectively abutting the housing 228 within the pocket 240 and an end wall of an annular recess 242 provided in the piston 239 bias the latter to the impeller braking position shown in FIG. 9. The pocket 240 is vented to the atmosphere by a passage 243 to maintain free action of the springs 241.

Oil supply is provided by a pump 244 whose output flows through a pipe 245 to the toroidal circuit 229 and from the latter to an annular passage 246 which connects with a chamber 247 included between the disk 218 and a cup-shaped member 225, the chamber 247 communicating with the clutch engaging chamber 231 through a passage 248 in the disk 218. The passage 246 also connects through passages 249 and 250 in the cup-shaped member 225 and converter housing 228, respectively, with a pipe 251 leading to a chamber 252 forming part of a regulating valve 253.

Slidable in the regulating valve 253 is a piston 254 which is actuated by a handle 255 operating through a helical spring 256. In the fully retracted position of the piston 254, it fully uncovers a pipe 257 which connects with a sump 258. Accordingly, in the shown position of the piston 254, the output of the pump 244 flows to the sump 258, the clutch 220 is released by the springs 232, and the brake 259, comprising the impeller hub 233, brake plate 238 and piston 239, is engaged by the springs 241. Therefore, the impeller 222 is held stationary against otherwise possible rotation and unwanted torque on the load shaft 226 which might be set up by oil drag on the plates of the clutch 220.

When the piston 254 is moved towards the right, the pressure begins to rise in the toroidal circuit 229 which begins to release the brake 259 and also in the chamber 231 so that the piston 230 begins moving in the direction to engage the clutch 220. In some positions of the piston 254, the impeller 222 may be subjected to a combined braking and powering action to vary torque on the load shaft 226 and with the brake 259 fully released, torque on the load shaft 226 is a function of the variable, controlled pressure acting on the piston 218.

In FIGS. 10 to 14, inclusive, are shown a variety of power trains which employ a constant speed power source and a master, controllable slip, friction clutch as a means for varying the torque and speed of a load shaft and which are particularly designed for electric railway operation. As noted above, it is possible with this type of power train to employ an induction motor as the constant speed power source operating with standard single or three-phase, alternating current having a frequency of 60 cycles. Electric power systems of this character are readily available and the improved power train makes it possible to utilize such systems directly, thus eliminating the complexities involved in the use of direct current motors which is the common practice.

Referring to FIG. 10, the numeral 260 designates an induction motor which runs at constant speed and is drivably connected to an annulus 261 that in turn is controllably connected to a converter input shaft 262 by means of a master, friction plate clutch 263 which is hydraulically actuated as presently described and whose plates are conventionally related to the annulus 261 and input shaft 262, respectively, and gripped against an abutment ring 264 provided on the shaft 262.

An annular reaction plate 265, held against axial movement, is carried by the input shaft 262 and on its periphery is slidable a cylindrical shell 266 having annular end walls 267 and 268 which define with the shaft 262 and reaction plate 265 annular, clutch engaging and balance chambers 269 and 270, respectively.

The input shaft 262 connects with the rotating housing 271 of an hydraulic torque converter 272 which is shown as being of the single stage type, but this is not a limiting factor. Further, it is possible to employ a stationary housing converter since the essential ingredient of the invention is the control on the impeller. The housing 271 carries an impeller 273 which is conventionally related to a turbine 274 drivably connected to an intermediate shaft 275 and to a stator 276 which is held against rotation during periods of torque multiplication by the usual overrunning clutch 277 interposed between the stator hub 278 and a fixed part 279 of the adjacent equipment. The impeller 273, turbine 274 and stator 276 define the usual toroidal circuit 280.

The output end of the intermediate shaft 275 connects through a clutch controlled, forward and reverse mechanism, generally indicated by the numeral 281, with a load shaft 282. Specifically, the mechanism 281 includes an annular reaction member 283 carried by the intermediate shaft 275 and held against axial movement and slidable on the periphery of the reaction member 283 is a cylindrical shell 284 having annular end walls 285 and 286 which define with the reaction member 283 and the intermediate shaft 275 annular, clutch engaging chambers 287 and 288, all respectively.

The intermediate shaft 275 is connectible through a friction plate clutch 289 with a coaxial, annular flange 290 carried by a bevel gear 291 attached to the load shaft 282, the clutch 289 being engaged when the shell 284 is moved to the right to grip the plates of the clutch 289 against an abutment ring 292 carried by the shaft 275 to thereby provide forward drive. For reverse drive, the intermediate shaft 275 is connectible through a friction plate clutch 293 with an annular flange 294 carried by a suitably journaled bevel gear 295, the flange 294 and gear 295 being coaxial with the intermediate shaft 275 and the gear 295 meshing with an idler bevel gear 296 which in turn meshes with the gear 291, the gear 296 being held against revolution about the intermediate shaft 275. The clutch 293 is engaged by movement of the shell 284 to the left which grips the plates of the latter clutch against an abutment ring 297 carried by the intermediate shaft 275.

The clutches 263, 289 and 293 and the converter 272 are included in an hydraulic circuit whose arrangement and control will now be described. A pump 298 withdraws the oil from a sump 299 for delivery serially through a heat exchanger 300 and filter 301 to the inlet of a conventional spring loaded, relief valve 302 which connects with and under operating conditions constantly maintains in a pipe 303 leading to the clutch chambers 287 and 288 a relatively high pressure of, for example, 150 to 200 p.s.i.

The oil relieved by the valve 302 flows successively through a pipe 304, a collector ring 305 and a passage 306 included between the housing 274 and the hub of the stator 276 to the toroidal circuit 280 between the stator 276 and impeller 273, and the outlet from the toroidal circuit 280 is successively from between the turbine 274 and stator 276, a passage 307 collectively defined by the hubs of the turbine 274 and stator 276 and the shaft 275 to a collector ring 308 which connects with a pipe 309 leading to a chamber 310 provided in a regulating valve 311.

As in the other modifications, the regulating valve 311 includes a piston 312 which is manually operable through a spring 313 and oil pressure in the chamber 310, which under operating conditions is established by the position of the piston 312 in relation to a relief outlet 314 connecting with one end of a pipe 315, is transmitted successively through a pipe 316, a collector ring 317 and a passage 318 in the input shaft 262 with the master clutch engaging chamber 269. The pipe 316 is tapped by a pipe 319 including a throttling orifice 320 which connects through a collector ring 321 with a passage 322 in the input shaft 262 leading to the balance chamber 270. Oil is continuously supplied to the balance chamber 270 and discharge therefrom is through an annular orifice 323 to the sump 299. The other end of the relief pipe 315 connects successively through a collector ring 324 and a passage 325 in the input shaft 262 with the inner portions of the plates of the master clutch 263 to continuously supply a cooling oil flow thereto which thereafter collects in the sump 299.

The delivery end of the high pressure pipe 303 connects with an inlet port 326 of a selector valve 327 which also includes outlet ports 328 and 329, and ports 330 and 331 which connect with the sump 299. Reciprocable within the casing 332 of the selector valve 327 is a valve stem 333, conventionally shown as spool type, having end lands 334 and 335 and spaced therefrom an intermediate land 336. In this connection, it will be understood that wherever valve stems are denoted as being of the spool type, this is by way of example only and not restrictive. The outlet port 328 connects successively through a pipe 337, a collector ring 338 and a passage 339 in the intermediate shaft 275 with the reverse, clutch engaging chamber 288, and the outlet port 329 connects successively through a pipe 340, a collector ring 341 and a passage 342 in the intermediate shaft 275 with the forward, clutch engaging chamber 287. The high pressure pipe 303 is tapped between the relief and selector valve 302 and 327, respectively, by a pipe 343 which includes a throttling orifice 344 and connects successively through a collector ring 345 and a branched passage 346 in the intermediate shaft 275 with the inner portions of the plates of the clutches 289 and 293 to continuously supply cooling oil flow thereto which finally discharges to the sump 299.

In the position of parts shown in FIG. 10, it is considered that the motor 260 is running at the desired constant speed, that the regulating valve piston 312 is fully retracted to the right so that engaging pressure is not present in the master clutch chamber 269 and the clutch 263 is fully released, and that the relief valve 302 is open as shown to establish the high pressure in the pipe 303. In the shown position of the selector valve 327, the intermediate land 335 masks the inlet port 326 and the end lands 333 and 334 provide for communication between the outlet and sump connecting ports 328 and 330, and between the outlet and sump connecting ports 329 and 331, all respectively, so that the reverse and forward clutches 293 and 289, respectively, stand released and the mechanism 281 is in neutral position. The valve stem 333 is held in the neutral position shown by the engagement of a spring actuated ball 346 engaging a notch 347 in the land 335.

To start the car or train moving forward, the valve stem 333 is first moved to the right until the ball 346 engages a notch 348. This stem movement causes the land 335 to mask the sump port 331 and the intermediate land 336 to unmask the inlet port 326 and connect the same to the outlet port 329, while the outlet port 328 maintains communication with the sump port 330. Accordingly, the forward clutch 289 is fully engaged and thereafter power input to the converter 272 is established by shifting the regulating valve piston 312 to the left to raise the static pressure in the converter 272 and to start the shell 266 moving in the direction to engage the master clutch 263. A stepless control on the torque and speed transmitted to the load shaft 282 is therefore obtainable merely by varying the intensity of contact of the plates of the master clutch 263, every such change being accompanied by a change in the static pressure in the converter 272.

To shift from forward to reverse, the master clutch 263 is preferably released and the valve stem 333 is shifted to the left until the ball 346 engages a notch 349 in the land 335. This stem position causes the land 334 to mask the sump port 330 and the intermediate land 336 to move sufficiently to communicate the inlet and outlet ports 326 and 328, respectively, while the connection of the outlet port 329 to the sump port 331 is maintained. Thereafter, the master clutch 263 is controlled as stated.

Referring to FIG. 11, there is shown a further modified power train that is adapted for electric train service which differs generally from FIG. 10 in that the clutch-gear mechanism interposed between the converter and load shaft is conditioned so that both clutches in this mechanism may be simultaneously engaged to hold the electric train stationary and in which either clutch in the stated mechanism is controllably engaged to brake the load shaft under overhauling load conditions, such as when the train is slowing to a stop or it is desired to maintain the train at a constant speed when descending a grade. In connection with the latter aspect is the utilization of hydrodynamic braking provided by the converter.

Some of the subassemblies in FIG. 11 are identical with the corresponding arrangements in FIG. 10 and will be generally referred to since the similarities are apparent from drawing comparison.

In FIG. 11, the numeral 350 designates the constant speed, induction motor which connects with a converter input shaft 351 by means of a controllable, master, friction plate clutch 352 in the same manner as in FIG. 10, the clutch being engaged by an annular shell 353 slidable on a reaction member 354 and respectively defining therewith and with the shaft 351 annular, clutch engaging and balance chambers 355 and 356. Interposed between the shaft 351 and a fixed adjacent part 357 is an overrunning clutch 358 for the purpose of preventing reverse rotation of the converter impeller under braking conditions as hereinafter described.

The input shaft 351 connects with the rotating housing 359 of an hydraulic torque converter 360, the housing 359 carrying an impeller 361 which is related in the usual manner to a turbine 362 and a stator 363 to define a toroidal circuit 364. The stator 363 is held against rotation during periods of torque multiplication by an overrunning clutch 365 interposed between the hub of the stator 363 and a fixed part 366.

The turbine 362 is drivably connected to an intermediate shaft 367 whose output end connects with a load shaft 368 through a clutch controlled, forward and reverse gear mechanism generally indicated by the numeral 369. The mechanism 369 generally differs from the mechanism 281 in FIG. 10 in that the clutches of the former are individually controlled to provide any degree of intensity of contact between the plates thereof so that either clutch may be fully engaged to provide drive in the appropriate direction, or both clutches may be simultaneously fully engaged to hold the electric train stationary, or either clutch may be slipped to any extent desired for braking.

Specifically for forward drive, the intermediate shaft 367 carries an annular reaction member 370 on whose periphery is slidable an annular shell 371 having an annular end wall 372 for engaging a friction plate clutch 373 against an abutment ring 374 carried by the shaft 367. The shell 371 and end wall 372 define with the reaction member 370 and shaft 367 an annular engaging chamber 375 for receiving pressure oil. The plates of the clutch 373 are respectively connected to the intermediate shaft 367 and an annular flange 376 which is coaxial with the intermediate shaft 367 and is carried by a bevel gear 377 carried by the load shaft 368.

For reverse drive, the intermediate shaft 367 also carries a second reaction member 378 axially spaced from the reaction member 370 and on the periphery of the former member is slidable an annular shell 379 having an annular end wall 380 for engaging a friction plate clutch 381 against an abutment ring 382 carried by the intermediate shaft 367. The shell 379 and end wall 380 define with the reaction member 378 and intermediate shaft 367 an annular engaging chamber 383 for receiving pressure oil. The plates of the clutch 381 are respectively connected to the intermediate shaft 367 and an annular flange 384 carried by a suitably journaled bevel gear 385, the flange 384 and gear 385 being coaxial with the intermediate shaft 367 and the gear 385 meshing with an idler bevel gear 386 which in turn meshes with the bevel gear 377, the gear 386 being held against revolution about the intermediate shaft 367.

If it is desired to provide positive means for releasing the forward and reverse clutches 373 and 381, respectively, springs 373ª and 381ª may be interposed between the reaction member 370 and an end wall 372ª forming a part of the shell 371 and between the reaction member 378 and an end wall 380ª forming a part of the shell 379, all respectively. The reaction member 370 and end wall 372ª and the reaction member 378 and end wall 380ª define with the intermediate shaft 367 chambers 375ª and 383ª which are vented to the atmosphere by passages 375ᵇ and 383ᵇ, all respectively.

The clutches 352, 373 and 381 and the converter 360 are embodied in an hydraulic circuit whose arrangement and control will now be described. A pump 387 driven by the motor 350 withdraws oil from a typical sump 388 which serves as a collector for all draining parts of the hydarulic circuit as presently described and delivers the oil serially through a heat exchanger 389 and filter 400 to a chamber 401 provided in a regulating valve 402 having a piston 403. The piston 403 is manually operable through a spring 404 and its position in relation to a relief outlet 405 determines the pressure in the chamber 401 which connects with one end of a pipe 406.

The relief outlet 405 connects successively through a pipe 407 and a collector ring 408 with the toroidal circuit 364 between the stator 363 and impeller 361 and the oil is discharged from the toroidal circuit 364 between the turbine 362 and stator 363 and through a collector ring 409 to one end of a pipe 410, all as described for FIG. 10. The other end of the pipe 410 connects with a chamber 411 in a regulating valve 412 having a piston 413 which is manually operable through a spring 414 and whose position in relation to a relief outlet 415 determines the pressure in the chamber 411 which connects with one end of a pipe 416.

The pipe 416 connects successively through a collector ring 417 and a passage 418 in the input shaft 351 with the master clutch engaging chamber 355. Anterior to the collector ring 417, the pipe 416 is tapped by a pipe 418 which includes an orifice 419 and is connected through a collector ring 420 with a passage 421 in the input shaft 351 leading to the balance chamber 356 from which the oil is continuously discharged through an annular passage 422 to the sump 388. The relief outlet 415 connects successively through a pipe 423, a collector ring 424 and a passage 425 in the input shaft 351 with the inner portions of the plates of the master clutch 352 to supply cooling oil thereto and eventual drainage to the sump 387.

Referring to the pipe 406 which supplies pressure to the clutches 373 and 381 under control as to the clutch selected and the pressure supplied, the delivery end of the pipe 406 connects with an inlet port 426 provided in a selector valve 427 which otherwise includes outlet ports 428 and 429 and sump connecting ports 430 and 431. Reciprocable within the casing 432 of the selector valve 427 is a spool type, valve stem 433 having end lands 434 and 435 and spaced therefrom an intermediate land 436. In the shown neutral position of the selector valve 427, the land 436 masks discharge from the inlet port 426 and the lands 434 and 435 are positioned to place the outlet ports 428 and 429 in communication with the sump ports 430 and 431, respectively.

The selector valve 427 connects through a second selector valve 437 with the engaging chambers 375 and 383 of the clutches 373 and 381, respectively, in the following manner. The second selector valve 437 in the position shown merely provides a pair of conduits for connecting the engaging chambers 375 and 383 through the selector valve 427 with the sump 388 and in another position, due to its direct connection with the pipe 406, provides for simultaneous engagement of the clutches 373 and 381 to hold the electric train stationary. Specifically, the outlet ports 428 and 429 connect through pipes 438 and 439 with inlet ports 440 and 441, all respectively, in the second selector valve 437 which otherwise includes outlet ports 442 and 443 and a second pair of inlet ports 444—444 which, for a purpose presently explained, connect through a branched pipe 445 with the pipe 406.

Reciprocable within the casing 446 of the second selector valve 437 is a spool type, valve stem 447 having end lands 448 and 449 and spaced therefrom an intermediate land 540. In the shown position of the valve stem 447, the inlet ports 444—444 which communicate directly with the pipe 406 are masked by the lands 449 and 450 and the poistion of the intermediate land 450 in relation to the end lands 448 and 449 is such as to communicate the inlet and outlet ports 440 and 442, respectively, and the inlet and outlet ports 441 and 443, respectively.

The outlet port 442 connects successively through a pipe 451, a collector ring 452 and a passage 453 in the intermediate shaft 367 with the forward, clutch engaging chamber 375, and the outlet port 443 connects successively through a pipe 454, a collector ring 455 and a passage 456 in the intermediate shaft 367 with the reverse, clutch engaging chamber 383.

Provision is also made for cooling either of the clutches 373 and 381 under engaging conditions or when either acts as a brake. For this purpose, a pump 457 driven by the motor 350 and having conventional relief (not shown) withdraws oil from the sump 388 for delivery successively through a heat exchanger 458, a filter 459 and a pipe 460 leading to an inlet chamber 461 provided in a selector cooling valve 462 which otherwise includes outlet ports 463 and 464 and a sump connecting port 465. Reciprocable within the casing 466 of the cooling valve 462 is a spool valve stem 467 having for purpose of flow control end lands 468 and 469 and spaced therefrom an intermediate land 470.

The outlet port 463 connects successively through a pipe 471, a collector ring 472 and a passage 473 in the intermediate shaft 367 with the inner portions of the plates of the forward clutch 373 while the outlet port 464 connects successively through a pipe 474, a collector ring 475 and a passage 476 in the intermediate shaft 367 with the inner portions of the plates of the reverse clutch 381. Both of these oil supplies are for the purpose of cooling the plates of the respective clutches under controlled conditions and the cooling oil discharged from the clutches 373 and 381 collects in the sump 388.

The valve stem 467 is maintained in any one of three selected positions by means of axially spaced notches 477, 478 and 479 provided in a land 480 forming part of the valve stem 467 and which are selectively engaged by a spring actuated ball 481. In the position of the valve stem 467 as shown, the ball 481 seats in the center notch 478 to thereby communicate the inlet chamber 461 with the sump port 465 and to bar flow from the inlet chamber 461 to either of the outlet ports 463 and 464.

In describing the operation of the FIG. 11 power train, it will be assumed that the electric car, bus or train is at rest with the motor 350 running at constant speed and all valving controls in the several positions shown. All output of the pump 387, which is driven by the motor 350, is then succesively through the regulating valve 402, converter 360, regulating valve 412, pipe 423, collector ring 424 and passage 425 to the plates of the clutch 352 and thence to the sump 388, the clutch 352 being released. Similarly, the output of the pump 457 moves through the cooling valve 462 to the sump 388.

The selector valve 427 is held in any one of three positions by a spring actuated ball 482 engaging selected notches 483, 484 and 485 provided in the land 434 and in the neutral position shown, the ball 482 engages the notch 484. The second selector valve 437 is held in either of two positions by a spring actuated ball 486 engaging notch 487 or 488 and, in the position shown, the ball 486 engages notch 488. Since the selector valve 427 is in neutral position and the second selector valve 437 is in a position denying flow through the pipe 445, the forward and reverse clutches 373 and 381, respectively, stand released.

For a smooth start in forward direction, the selector valve stem 433 is moved to the right until the ball 482 seats in the notch 483 to cause the land 434 to mask the sump port 430, to connect the inlet and outlet ports 426 and 428, respectively, to thereby provide a pressure line connection from the pipe 406 through the pipes and passages referred to above including the second selector valve 437 to the forward, clutch engaging chamber 375, and to maintain communication between the outlet and sump ports 429 and 431 so that a pressure connection does not exist to the reverse, clutch engaging chamber 383. Since the regulating valve 402 is in its lowest pressure setting position, the pressure in pipe 406 is very low and is effective to only cause an incipient engagement of the plates of the forward clutch 373.

Coincident with the movement of the selector valve stem 433 to forward drive positon, the cooling valve stem 467 is also shifted to the right until the ball 481 seats in the notch 477. This positioning of the stem 467 causes the lands 468 and 470 to mask the sump and outlet ports 465 and 464, respectively, and to connect the inlet chamber 461 with the outlet port 463, thereby providing a cooling oil flow to the plates of the forward clutch 373 which is about to be engaged.

Pressure in the pipe 406 is then gradually increased up to the maximum pressure through the regulating valve 402 by shifting a plunger 489 and through the spring 404 moving the piston 403 to the left and thereby establishing maximum torque transmitting condition of the forward clutch 373. Final power connection between the motor 350 and the load shaft 368 is achieved by engaging the master clutch 352. This step is accomplished by the regulating valve 412 and specifically by compressing the spring 414 by a plunger 490, thus shifting the piston 413 to the left and gradually applying engaging pressure to the clutch engaging chamber 355 and constantly supplying cooling oil to the plates of the master clutch 352. As in the other modifications, the capacity for slipping the master clutch 352 under precise control provides for a stepless variation in the torque and speed transmitted to the load shaft 368.

For movement in reverse direction from a standing position, the regulating valves 402 and 412 are in the shown positions and the valve stems 433 and 467 of the selector and cooling valves 427 and 462 are shifted to the left to engage the ball 482 with the notch 485 and the ball 481 with the notch 479, all respectively. The second selector valve 437 remains in the position shown. With these positionings of the selector and cooling valves 427 and 462, respectively, it will be apparent that a pressure connection is made to the engaging chamber 383 of the reverse clutch 381 and cooling oil flow is established to the plates of this clutch. Thereafter, the operations of the regulating valves 402 and 412 are the same as for forward drive with respect to pressure control, namely, the valve 402 first establishes full engagement of the reverse clutch 381 and, thereafter, the valve 412 establishes any desired engagement of the master clutch 352.

If it is desired to brake the electric train while moving forwardly, the master clutch 352 and the forward drive clutch 373 are released by moving the regulating valves 402 and 412 to the relieving positions shown in FIG. 11 and the selector and cooling valves 427 and 462 are moved to the reverse drive positions in which the balls 482 and 481 engage the notches 485 and 479, all respectively. The regulating valve 462 is then controllable to gradually raise the pressure in the pipe 406 and hence in the engaging chamber 383 of the reverse clutch 381, the plates of the latter clutch being constantly supplied with cooling oil through the cooling oil valve 467. With the reverse clutch 381 engaged, the load shaft 368 through the bevel gears 377, 386 and 385 causes the turbine 362 to rotate reversely and since the stator 363 is held against rotation by the overrunning clutch 365, the torque is hydrodynamically absorbed in the converter 360. This torque absorption may be variably controlled for obvious reasons by the regulating valve 402. The overrunning clutch 358 may be employed to prevent reverse rotation of the impeller 361 under braking conditions.

The braking action above occurs with the master clutch 352 fully released, but additional hydrodynamic braking effect can be secured in any variable amount and under the above conditions by operating the regulating valve 412 to establish any desired engaging pressure in the master clutch chamber 355. The impeller 361 then rotates in its usual direction and oppositely to the then reversed rotation of the turbine 362.

When the electric train has been brought to a stop, it is held stationary through the medium of the second selector valve 437, the valve stem 447 thereof being shifted to the right until the ball 486 seats in the notch 487. The lands 448 and 450 then respectively mask the inlet ports 440 and 441 hitherto providing connections with the selector valve 427 and the lands 450 and 449 uncover the ports 444—444 which connect with the pipe 445. The selector valve 427 is accordingly bypassed and pressure oil, the regulating valve 402 being suitably positioned, is admitted through the second selector valve 437, pipes 451 and 454, and passages 453 and 456 to the engaging chambers 375 and 383, all respectively. The forward and reverse clutches 373 and 381, respectively, are therefore simultaneously engaged.

Referring to FIG. 12, there is disclosed a further modification which is basically identical with the FIG. 10 power train except for the addition of an hydraulically operated brake which has an actuating member that is common with the master clutch. Parts in FIG. 12 which are functionally identical with those in FIG. 10 are designated by the same numerals. The identical parts and subassemblies are the motor 260, annulus 261, master clutch 263, converter 272 and the oil supply thereto, relief and regulating valves 302 and 311, respectively, selector valve 327 and the clutch-gear mechanism 281.

The power connection made by the master clutch 263 is to a converter input shaft 491 that is drivably connected in the conventional manner to the rotating housing 271 of the converter 272. The input shaft 491 carries a reaction member 492 that is held against axial movement and on whose periphery is slidable a cylindrical shell 493 having annular end walls 494 and 495 which define with the shaft 491 and reaction member 492 annular master clutch and brake engaging chambers 496 and 497, respectively. When the shell 493 is moved to the left, it engages the master clutch 263 against the abutment ring 264 by means of infinitely controllable pressures, and when moved to the right, it engages by similarly controllable pressures a friction plate brake 498 against an abutment ring 499 carried by the input shaft 491, the plates of the brake 498 being respectively carried by and slidable relative to the input shaft 491 and a fixed part 500.

An overrunning clutch 501 is interposed between the input shaft 491 and a coaxial intermediate shaft 502 which otherwise functions like the intermediate shaft 275 in FIG. 10. The purpose of the clutch 501 is to prevent the turbine 274 from rotating faster in the normal direction than the impeller 273 and to always permit the impeller 273 to rotate faster than the turbine 274. A further minor difference from FIG. 10 resides in the cooling oil supply to the forward and reverse clutches 289 and 293, respectively. In FIG. 12, this is accomplished by tapping the oil supply pipe 304 to the toroidal circuit 280 by a pipe 503 including a throttling orifice 504, the delivery end of the pipe 503 communicating through a collector ring 505 with the passage 346 leading to the plates of the clutches 289 and 293. The selector valve 327 is operable to control the forward and reverse clutches 289 and 293, respectively, in the same manner as described for FIG. 10.

Controllable engaging pressure for the master clutch 263 and brake 498 and cooling oil for the plates thereof, respectively, are determined by a selector valve 506 interposed between the regulating valve 311 and cooling oil, clutch and brake engaging passages in the input shaft 491.

For the master clutch and brake engaging pressure, a pipe 507 connects the chamber 310 with an inlet port 508 in the casing of the selector valve 506 which otherwise includes, in operative relation to the inlet port 508, sump connecting ports 510 and 511, and outlet ports 512 and 513, the casing of the selector valve 506 being designated by the numeral 509. The port 512 connects successively through a pipe 514, a collector ring 515 and a passage 516 in the input shaft 491 with the brake engaging chamber 497, and the port 513 connects successively through a pipe 517, a collector ring 518 and a passage 519 in the input shaft 491 with the master clutch engaging chamber 496.

For the cooling oil to the plates of the master clutch 263 and brake 498, a pipe 520 connects the relief outlet 314 of the regulating valve 311 with an inlet port 521 in the casing 509 which otherwise includes, in operative relation to the port 521, outlet ports 522 and 523. The port 522 connects successively through a pipe 524, a collector ring 525 and a passage 526 in the input shaft 491 with the inner portions of the plates of the master clutch 263 from which the oil drains to the sump 299, and the port 523 connects successively through a pipe 527, a collector ring 528 and a passage 529 in the input shaft 491 with the inner portions of the plates of the brake 498 from which the oil drains to the sump 299.

To control the selector valve 506, a valve stem 530 is reciprocable in the casing 509 in operative relation to the several ports of the valve 506 and is provided with suitably spaced lands 531, 532, 533 and 534 and is held in the position shown, which is that of start, by a spring actuated ball 535 engaging a notch 536 in the land 534. In this start position, the lands 534 and 533 respectively unmask the sump and outlet ports 510 and 512 so that pressure does not exist in the brake chamber 497, and the lands 533 and 532 are related, the land 532 additionally masking the sump port 511, so as to establish a pressure connection between the inlet and outlet ports 508 and 513 and the connecting pipe and passages leading to the master clutch engaging chamber 496.

For the cooling oil, the lands 532 and 531 are related to connect the inlet and outlet ports 521 and 522, respectively, so that cooling oil can flow through the indicated pipe and passage to the plates of the master clutch 263, while the land 531 masks the outlet port 523 so that cooling oil cannot flow to the plates of the brake 498. It will be noted that while the described position of the valve stem 530 establishes a pressure connection to the master clutch chamber 496, actually the pressure in the pipe 507 is very low due to the fully retracted position of the regulating valve piston 312 and the fact that the pipe 520 connects through the selector valve 506 with the plates of the master clutch 263 and thence with the sump 299.

Considering the electric train stationary with the motor 260 running at its constant speed, the stated high pressure existing in the pipe 303, and the valve stem 530 in the position shown, the first step in initiating forward movement is, as described for FIG. 10, the shifting of the selector valve 327 to the position determining full engagement of the forward drive clutch 289. Piston valve 312 is then shifted to the left to any extent desired and, as also described for FIG. 10, to thereby controllably apply pressure through the pipe 507 to the master clutch 263, the control being smooth, stepless and of infinite variety. At the same time, cooling oil is continuously supplied through the pipe 520 to the plates of the master clutch 263.

To brake, the regulating valve 311 is returned to the fully retracted position shown which releases the master clutch 263 and the valve stem 530 is shifted to the right until the ball 535 seats in a notch 537. The land 534 then masks the sump port 510, and the relation between the lands 533 and 532 is then such as to communicate the outlet port 513 and hence the master clutch chamber 496 with the sump port 511, and the relation between the lands 533 and 534 is such as to communicate the inlet port 508 with the outlet port 512 and hence with the brake chamber 497. The regulating valve 311 then controllably applies pressure to the brake 498 in the same manner that it did to the master clutch 263. At the same time, cooling oil is continuously supplied to the plates of the brake 498 since the land 532 then masks the outlet port 522 connecting with the plates of the master clutch 263 and the land 531 then places in communication the inlet port 521 and the outlet port 523 leading to the plates of the brake 498. With the master clutch 263 released, some benefit will be secured from hydrodynamic braking in the converter 272 due to back drive therethrough.

In FIG. 13 is shown a further modification of FIG. 10 which is identical therewith as to basic components and differs therefrom in the use of an hydraulically controlled retarder for braking and the selective shift of oil flow to the converter or the retarder depending upon whether power flow or braking is desired. Parts in FIG. 13 which are functionally similar to those in FIG. 10 are identified by the same numerals.

In FIG. 10, the relief outlet of the relief valve 302 connects with the toroidal circuit 280 of the converter 272 by the pipe 304, but in FIG. 13, the indicated outlet of the relief valve 302 connects by a pipe 538 with an inlet port 539 provided in the casing 540 of a selector valve 541 which otherwise includes a sump connecting port 542 and outlet ports 543 and 544. The outlet port 543 connects successively through a pipe 545 and a collector ring 546 with the toroidal circuit 280 in the same manner as described for FIG. 10 and the discharge from the converter 272 is successively through a collector ring 547 and a pipe 548 to the chamber 310 of the regulating valve 311 whose relation to and control of the master clutch 263 is the same as in FIG. 10.

The outlet port 544 connects by a pipe 549 with the stationary bladed member 550 of an annular, hydraulic retarder 551 whose bladed rotating member 552 is fast to the intermediate shaft 275 and which cooperates with the stationary member 550 and defines therewith an annular working chamber 553 which, by way of example, is shown as having a circular cross section. In effect, the retarder 552 resembles an hydraulic coupling under a stall condition.

The working chamber 553 connects by a pipe 554 with a chamber 555 provided in the casing 556 of a controllable regulating valve 557 which otherwise has a relief port 558 connecting with the sump 299. Flow from the chamber 555 to the relief port 558 is controlled by a piston 559 reciprocable in the casing 556 and actuated towards the left through a spring 560.

Considering the FIG. 13 power train with the motor 260 running at constant speed and the parts in the positions shown, the relief valve 302 has established the relatively high pressure in the pipe 303. For the selector valve 541 which includes a valve stem 561 of the spool type reciprocable in the casing 540 and having spaced lands 562, 563 and 564, the stem 561, in the position shown, is held by a spring actuated ball 565 engaging a notch 566 in the land 564. In the position shown, the relation of the lands 563 and 564 is such that the inlet and outlet ports 539 and 543, respectively, are in communication and relief oil from the relief valve 302 may flow to the converter toroidal circuit 280. Further, the relation of the lands 563 and 562 is such that the sump and outlet ports 542 and 544, respectively, are in communication and the working chamber 553 of the retarder 551 accordingly connects with the sump 299. The regulating valve 557 is in the full open position shown.

The electric train is started in a forward direction in the same manner as in FIG. 10, i.e., the forward clutch 289 is first fully engaged followed by the controlled engagement of the master clutch 263, the converter 272 being supplied and filled with working oil through selector valve 541 in the shown position. To retard movement of the electric train, the master clutch 263 is released as described above and the selector valve stem 561 is shifted to the right until the ball 565 engages the notch 567. The land 564 then masks the outlet port 543 and the position of the land 563 is such that the inlet and outlet ports 539 and 544, respectively, are placed in communication so that oil is supplied to the working chamber 553 of the retarder 551 and the theretofore communication of the latter with the sump port 540 is masked by the shifted position of the land 563. Braking action by the retarder 551 is controlled in the obvious manner by controlling the pressure therein by the regulating valve 557.

Since the braking effectiveness of the retarder 551 is higher at relatively high than at relatively low speeds, it is recognized that conventional equipment may be used to brake at low speeds and to hold the electric train stationary.

In FIG. 14 is fragmentarily shown a modification which may be incorporated in the FIGS. 10 to 13 arrangements but which is specifically shown as applied to the FIG. 12 transmission and which employs a variable clutch controlled gear mechanism which enables the converter impeller to be rotated at a higher speed than that of the constant speed power source to obtain greater acceleration during selected periods of operation. Where parts and subassemblies in FIG. 14 are identical with those in FIG. 12, they are identified by the same numerals.

The constant speed power source 260 is drivably connected to an annular shell 568 which in turn is connectible through a first master, friction plate clutch 569 to one end of a converter input shaft 570 whose opposite end connects with the rotating housing 271 of the converter 272. Carried by the shaft 570 and held against axial movement is an annular reaction member 571 on whose periphery is slidable in cylindrical shell 572 having end walls 573 and 574 and which define with the reaction member 571 and shaft 570 clutch engaging chambers 575 and 576, respectively. The input shaft 570 also carries annular abutment rings 577 and 578, the former ring constituting an abutment for the plates of the first master clutch 569 when the shell 572 is moved to the left and the latter ring an abutment for the plates of a second, master friction clutch 579 when the shell 572 is moved towards the right.

The shaft 570 includes passages 580 and 581 for delivering engaging pressure to the clutch chambers 575 and 576 as supplied by the pipes 517 and 514, all respectively, and also passages 582 and 583 for delivering cooling oil to the plates of the master clutches 569 and 579 as supplied by the pipes 524 and 527, all respectively, and all under the control of the selector valve 506.

To provide acceleration of the impeller 273, the shell 568 carries a gear 584 which meshes with a gear 585 of substantially smaller diameter mounted on an appropriately journaled countershaft 586 which also carries a gear 587 having a diameter substantially larger than the gear 585, and the gear 587 meshes with a suitably journaled gear 588. In the two plate clutch 579, one plate thereof has the usual driven and relative sliding engagement with the gear 588 internally thereof and the relative sizings of the gears in the last noted gear train are obviously a matter of choice.

It will be understood that the FIG. 14 power train will additionally include the selector valve 327 and gear mechanism 281 in the same relation as shown in FIG. 12, the converter output or intermediate shaft 589 being connected to the clutches of the gear mechanism 281.

With the FIG. 14 transmission conditioned as shown, the relief and regulating valves 302 and 311 are fully retracted, the master clutches 569 and 579 stand released due to the shown position of the selector valve 506 and for the same reasons as set forth for FIG. 12. The FIG. 14 transmission can be started forward, for example, in the same manner as in FIG. 12, namely, by first fully engaging the forward drive clutch 289 and thereafter controllably applying the master clutch 569.

For greater acceleration in the forward direction, it may be desirable to better utilize the torque rise of the induction motor 260 and this can be accomplished by moving the shell 572 to the right to engage the master clutch 579 under the control of the regulating valve 311, the master clutch 569 then being released. This shell movement is effected by shifting the selector valve stem 530 to the right until the ball 535 engages the notch 537. The motor 260 then drives the input shaft 570 through the gears 584, 585, 587 and 588 and master clutch 579 which produces a higher speed of the input shaft 570 and increases the specific torque of the converter 272. This arrangement avoids the complication and efficiency loss inherent in other developments which employ adjustable blades in the converter.

As noted above, the use of a variable capacity, friction plate clutch as a means of varying the output torque or speed of a constant speed power source is not restricted to controlling the input to an hydraulic torque converter. The latter is merely one example of a device having a bladed member rotatable in a fluid and which absorbs torque proportional to some function of its speed. Examples thereof have heretofore been identified and the application of the invention to one of them, a centrifugal pump, is schematically shown in FIG. 15 to which reference will now be made.

A constant speed power source 590 connects with an annular shell 591 and thence through an annular, friction plate clutch 592 with a shaft 593, alternate plates being connected in the usual manner to the shell 591 and intervening plates to the shaft 593. A reaction member 594 is fast on the shaft 593 and held against axial movement and slidable on the periphery of the member 594 is a cylindrical shell 595 having end walls 596 and 597 which define with the shaft 593 and member 594 annular clutch engaging and balance chambers 598 and 599, respectively. The output end of the shaft 593 connects with the bladed impeller 600 of a conventional centrifugal pump 601 having an inlet 602 and an outlet 603 for the fluid being handled.

Oil for the operation and cooling of the clutch 592 is provided by a pump 604 whose outlet connects with a chamber 605 provided within a regulating valve 606. Reciprocable within the valve 606 is a piston 607 which is actuable through a spring 608 by a handle 609. In the shown fully retracted position of the piston 607, it uncovers the inlet of a pipe 610 which connects through a collector ring 611 and a branched passage 612 in the shaft 593 to supply cooling oil to the inner portions of the plates of the clutch 592 and to supply oil to the balance chamber 599, respectively, the chamber 599 communicating through an annular orifice passage 613 with a sump (not shown). The chamber 605 constantly connects successively through a pipe 614, collector ring 615 and passage 616 in the shaft 593 with the engaging chamber 598.

With the pump 604 running and the parts in the positions shown, the clutch 592 stands released. As in the other modifications, it will be apparent that an infinitely variable conditioning of the clutch 592 can be obtained by positionings of the valve piston 607 to provide stepless torque or speed applications to the shaft 593. Accordingly, it is possible, with a variable supply in the centrifugal pump inlet 602 to maintain a constant head in the centrifugal pump outlet pipe 603, or to maintain a constant head in the same pipe to meet varying demands.

I claim:

1. A power transmission comprising in series power flow relation a hydraulically actuated friction plate clutch including an engaging chamber and having its input connectible to a constant speed power source and a hydraulic torque converter whose input is connected to the clutch output and whose output is arranged for connection to a load, and a hydraulic system including a pump consituting a source of liquid pressure, the toroidal circuit of the converter which connects with the output of the pump, the engaging chamber, valve means interposed between the toroidal circuit and engaging chamber, passages respectively connecting the valve means with the engaging chamber and clutch plates, and means for infinitely positioning the valve means relative to the clutch plate passage to vary the pressure in the engaging chamber and toroidal circuit and the latter passage constituting the relief for the valve means and supplying cooling liquid to the clutch plates.

2. A power transmission comprising in series power flow relation a hydraulically actuated friction plate clutch including an engaging chamber and having its input connectible to a constant speed power source and a hydraulic torque converter whose output is arranged for connection to a load, means for constantly maintaining the toroidal circuit of the converter filled with working liquid, a shaft connecting the clutch to the converter impeller, and a hydraulic sysem including a pump constituting a source of liquid pressure, the engaging chamber, brake means biased to a position holding the shaft stationary when the clutch is released and including a chamber for receiving the liquid pressure to release the brake, valve means interposed between the pump and clutch engaging chamber and brake release chamber, and passage means branched to connect the valve means with the clutch engaging and brake release chambers, respectively, and means for infinitely positioning the valve means to vary the pressures in the clutch engaging and brake release chambers.

3. A power transmission comprising in series power flow relation a friction plate clutch having an engaging chamber for receiving a pressure liquid and its input connected to a constant speed power source and an hydraulic torque converter having an impeller connected to the clutch output and otherwise including a turbine arranged for connection to a load and a stator, the impeller, turbine and stator defining a toroidal circuit, means for constantly maintaining the toroidal circuit filled with working liquid at a basic pressure, means for supplying cooling liquid to the clutch plates, and means for varying the pressure in the engaging chamber in response to a predetermined flow condition in the toroidal circuit comprising a pump connecting with the engaging chamber for supplying pressure liquid thereto, valve means for regulating the supplied pressure liquid, piston means reciprocable in a casing and defining therewith chambers on opposite sides of the piston means, the piston means being connected with the valve means to control its position and biased to determine a maximum pressure in the engaging chamber, and Pitot tubes positioned in the toroidal circuit adjacent the inlet and outlet of the stator and communicating, respectively, with the piston means chambers on the unbiased and biased side of the piston means, the pressure in the chamber on the unbiased side of the piston means relative to that in the other chamber being higher as converter operation approaches said flow condition to lower the pressure in the engaging chamber.

4. A power transmission comprising a constant speed power source, a shaft connected thereto, an hydraulic torque converter having a housing, an impeller and a turbine positioned within the housing and respectively connected to the shaft and a load shaft, and a stator carried by the housing, the impeller, turbine and stator defining a toroidal circuit having an inlet and an outlet and the impeller having a cylindrical shell extending therefrom, an annular friction plate clutch for providing a connection between the shaft and impeller shell, a piston reciprocable in the shell for engaging the clutch and defining with the shell a clutch engaging chamber for receiving pressure oil, and an hydraulic system including the toroidal circuit, a pump for continuously supplying pressure oil to the toroidal circuit inlet, passage means connecting the toroidal circuit and clutch engaging chamber, valve means interposed between the toroidal circuit outlet and a sump, means for infinitely positioning the valve means to vary the pressure in the toroidal circuit and clutch engaging chamber, and other passage means tapping the toroidal circuit to direct a cooling oil flow to the clutch plates.

5. A power transmission as defined in claim 4 wherein means is provided to move the piston to release position.

6. A power transmission comprising a constant speed power source, a shaft connected thereto, an hydraulic torque converter having a housing, an impeller and a turbine positioned within the housing and respectively connected to the shaft and a load shaft, and a stator carried by the housing, the impeller, turbine and stator defining a toroidal circuit having an inlet and an outlet and the shaft having a cylindrical shell extending towards the impeller, an annular friction plate clutch for providing a connection between the shaft and impeller, a piston reciprocable in the shell for engaging the clutch and defining with the shell a clutch engaging chamber for receiving oil pressure, and an hydraulic system including the toroidal circuit, a pump for continuously supplying oil to the toroidal circuit inlet, passage means connecting the toroidal circuit and clutch engaging chamber, and brake means biased to a position locking the impeller to the converter housing when the clutch is released and including a release chamber communicating with the toroidal circuit, valve means interposed between the toroidal circuit outlet and a sump, means for infinitely positioning the valve means to vary the pressure in the toroidal circuit and the clutch engaging and brake release chambers, other passage means tapping the toroidal circuit to direct a cooling oil flow to the clutch plates, and means for moving the piston to a position enabling release of the clutch when the actuating pressure therefor is fully released.

7. For use with an electric induction motor, a power transmission comprising in series power flow relation a master friction plate clutch arranged for connection to the motor and including a chamber for receiving pressure oil to engage the clutch, an hydraulic torque converter having its input connected to the clutch and including a toroidal circuit, and a forward and reverse mechanism including slectively operable, friction plate clutches having a common input connection with the converter output and each clutch including a chamber for receiving pressure oil, a gear train including a first gear carried by a load shaft and connected to one clutch for forward drive, an idler gear meshing with the first gear and a second gear connected to the other clutch for reverse drive, and a hydraulic system comprising an oil supplying pump, a passage connecting the pump with the forward and reverse clutch chambers and including a selector valve shiftable between positions determining an engagement of the forward or reverse clutch and the release of both clutches, valve means for maintaining a determined pressure in the passage and having a relief outlet connected to the toroidal circuit for continuous filling thereof, a regulating valve having connections respectively with the toroidal circuit and the master clutch engaging chamber, the regulating valve having a relief outlet connecting with the master clutch plates to supply cooling oil thereto, and means for infinitely controlling the regulating valve to vary the pressure in the toroidal circuit and in the master clutch engaging chamber.

8. An arrangement as defined in claim 7 wherein a second selector valve connects with the passage anterior to the connection of the first named selector valve therewith and has connections with the outlets of the first named selector valve and with the forward and reverse clutch engaging chambers, the second selector valve in one position forming a part of the passage connecting the first named selector valve with the forward or reverse clutch chambers depending upon the position of the first named selector valve and in another position prevents flow through the first named selector valve and provides for simultaneous application of engaging pressure to the engaging chambers of the forward and reverse clutches to hold the load shaft stationary.

9. An arrangement as defined in claim 7 wherein friction plate brake means is provided having parts respectively connected to a stationary part and to a shaft connecting the master clutch with the converter and includnig a chamber for receiving pressure oil and an actuating member for the brake means which is common with the master clutch whereby an engagment of one determines the release of the other, the regulating valve having pressure connections with the master clutch and brake means chambers and relief outlet connections with the master clutch and brake means plates, both of said last named connections including a seocnd selector valve shiftable between one position determining an engagement of the master clutch, a supply of cooling oil to the plates thereof and release of the brake means, and another position determining an engagement of the brake means, a supply of cooling oil to the plates thereof and release of the master clutch, and the infinite control on the regulating valve varies pressure in the brake means chamber when pressure is supplied thereto.

10. For use with an electric induction motor, a power transmission comprising in series power flow relation a master friction plate clutch arranged for connection to the motor and including a chamber for receiving pressure oil to engage the clutch, an hydraulic torque converter having its input connected to the clutch and including a toroidal circuit and a stator held against reverse rotation, and a forward and reverse mechanism including selectively and independently operable, forward and reverse, friction plate clutches having a common input connection with the converter output and each clutch including a chamber for receiving pressure oil, a gear train including a first gear carried by a load shaft and connected to the forward clutch, and idler gear meshing with the first gear and a second gear connected to the reverse clutch, a first hydraulic system comprising a first oil supplying pump, a passage connecting the first pump with the forward and reverse clutch chambers and including a selector valve shiftable between positions determining an engagement of the forward or reverse clutch and the release of both of said last named clutches, an infinitely controllable first regulating valve in the passage for varying the pressure in the chamber of the engaged clutch in the mechanism and having an outlet connected to the toroidal circuit for continuous filling thereof, a second regulating valve having connections respectively with the toroidal circuit and the master clutch engaging chamber, the second regulating valve having an outlet connecting with the master clutch plates to supply cooling oil thereto, means for infinitely controlling the second regulating valve to vary the pressure in the toroidal circuit and in the master clutch engaging chamber, and a second hydraulic system including a second oil supplying pump and a cooling valve having connections with the forward and reverse clutch plates and a sump and movable between positions connecting the second pump to the sump or to the plates of the forward or reverse clutches.

11. For use with an electric induction motor, a power transmission comprising in series power flow relation a master friction plate clutch arranged for connection to the motor and including a chamber for receiving pressure oil to engage the clutch, an hydraulic torque converter having its input connected to the clutch and including a toroidal circuit, and a forward and reverse mechanism including selectively operable, forward and reverse, friction plate clutches having a common input connection with the converter output and each clutch including a chamber for receiving pressure oil, a gear train including a first gear carried by a load shaft and connected to the forward clutch, an idler gear meshing with the first gear and a second gear connected to the reverse clutch, an hydraulic retarder positioned between the converter and forward and reverse mechanism for braking the transmission when the master clutch is released comprising an annular stationary, bladed member and an annular rotatable, bladed member connected to the converter output and defining with the stationary member an annular working chamber for receiving oil, and a hydraulic system comprising an oil supplying pump, a passage connecting the pump with the forward and reverse clutch chambers and including a first selector valve shiftable between positions determining an engagement of the forward or reverse clutch and the release of both of said last named clutches, valve means for maintaining a determined pressure in the passage and having a relief outlet, a second selector valve having an inlet communicating with the valve means outlet and parallel outlets, one parallel outlet connecting with the toroidal circuit, a first regulating valve having connections respectively with the toroidal circuit and the master clutch chamber, the first regulating valve having a relief outlet connecting with the master clutch plates to supply cooling oil thereto, and the other parallel outlet connecting with the retarder working chamber, the second selector valve being shiftable between positions determining oil flow to the toroidal circuit or working chamber, a second regulating valve communicating with the working chamber, means for infinitely controlling the first regulating valve to vary the pressure in the toroidal circuit and in the master clutch chamber when the selector second valve connects with the toroidal circuit, and means for infinitely controlling the second regulating valve to vary the pressure in the working chamber when the second selector valve connects therewith.

12. A power transmission comprising in series power flow relation, first and second, master clutches of the friction plate type and arranged for selective connection to an electric induction motor and an hydraulic torque converter having a toroidal circuit, each master clutch including a chamber for receiving pressure oil to engage the associated clutch, the first master clutch being directly connected to the motor, a gear train connecting the second master clutch to the motor and arranged to provide for a higher rotative speed of the second clutch when engaged relative to that of the first clutch when engaged, and an hydraulic system including an oil supplying pump, the toroidal circuit, a regulating valve having pressure connections with the first and second clutch chambers and relief outlet connections with the plates of the first and second clutches, both of said last named connections including a selector valve shiftable between one position determining an engagement of the first clutch, a supply of cooling oil to the plates thereof and release of the second clutch and another position determining an engagement of the second clutch, a supply of cooling oil to the plates thereof and release of the first clutch, and means for infinitely controlling the regulating valve to vary the pressure in the chamber of the clutch being engaged.

References Cited by the Examiner
UNITED STATES PATENTS

| | | | |
|---|---|---|---|
| 2,239,129 | 4/41 | Szekely | 192—3.2 X |
| 2,561,104 | 7/51 | Fawick | 74—379 |
| 2,836,271 | 5/58 | Jaeschke | 192—3.2 |
| 2,861,480 | 11/58 | Curtis | 74—732 |
| 2,931,472 | 4/60 | Ahlen | 192—3.2 |
| 2,968,197 | 1/61 | DeLorean | 74—732 X |
| 2,968,967 | 1/61 | Ross | 74—472 |
| 2,969,131 | 1/61 | Black et al. | 192—113 X |
| 3,006,219 | 10/61 | Snoy | 74—723 X |
| 3,033,333 | 5/62 | Breting et al. | |
| 3,064,779 | 11/62 | Christenson. | |
| 3,088,339 | 5/63 | Black | 74—472.3 X |

DON A. WAITE, *Primary Examiner.*